United States Patent
Okamoto et al.

(10) Patent No.: US 7,843,968 B2
(45) Date of Patent: Nov. 30, 2010

(54) COMMUNICATION APPARATUS AND APPLICATIONS THEREOF

(75) Inventors: Kazuaki Okamoto, Moriguchi (JP); Hideo Hirono, Moriguchi (JP)

(73) Assignee: Sanyo Electric Co., Ltd., Osaka (JP)

(*) Notice: Subject to any disclaimer, the term of this patent is extended or adjusted under 35 U.S.C. 154(b) by 1140 days.

(21) Appl. No.: 11/003,982

(22) Filed: Dec. 6, 2004

(65) Prior Publication Data

US 2005/0083917 A1 Apr. 21, 2005

Related U.S. Application Data

(63) Continuation of application No. PCT/JP03/12166, filed on Sep. 24, 2003.

(30) Foreign Application Priority Data

| Sep. 30, 2002 | (JP) | ............................. 2002-287870 |
| Oct. 29, 2002 | (JP) | ............................. 2002-315085 |
| Jan. 10, 2003 | (JP) | ............................. 2003-005100 |
| Jan. 10, 2003 | (JP) | ............................. 2003-005101 |

(51) Int. Cl.
*H04J 3/24* (2006.01)
(52) U.S. Cl. ..................... 370/474; 370/392; 370/465; 370/469; 370/471
(58) Field of Classification Search ............ None
See application file for complete search history.

(56) References Cited

U.S. PATENT DOCUMENTS

| 5,701,316 | A  * | 12/1997 | Alferness et al. | 714/807 |
| 6,625,147 | B1 * | 9/2003 | Yokoyama et al. | 370/389 |
| 6,628,617 | B1 * | 9/2003 | Karol et al. | 370/237 |
| 6,850,519 | B1 * | 2/2005 | Saito et al. | 370/389 |
| 6,901,508 | B2 * | 5/2005 | Park et al. | 713/153 |
| 7,242,681 | B1 * | 7/2007 | Van Bokkelen et al. | 370/389 |
| 7,274,706 | B1 * | 9/2007 | Nguyen et al. | 370/419 |
| 7,606,155 | B2 * | 10/2009 | Higashida | 370/235 |
| 2003/0095567 | A1 * | 5/2003 | Lo et al. | 370/466 |

FOREIGN PATENT DOCUMENTS

JP 01-109837 4/1989

(Continued)

OTHER PUBLICATIONS

Korean Office Action issued in corresponding Korean Patent Application No. 10-2004-7014902 dated Dec. 29, 2006.

(Continued)

*Primary Examiner*—Michael J Moore, Jr.
(74) *Attorney, Agent, or Firm*—McDermott Will & Emery LLP

(57) ABSTRACT

A technology for efficiently processing data communication using a plurality of communications protocols is provided. In the Internet phone apparatus, when a network interface section receives packets, a protocol detecting section determines whether the received packets are TCP packets or UDP packets. In the case TCP packets, a CPU, a general-purpose circuit, processes the packets using software. In the case of UDP packets, a UDP processing section, a dedicated circuit, processes the packets. Audio data transmitted and received in UDP packets are decoded by a codec processing section and output to a speaker.

14 Claims, 20 Drawing Sheets

FOREIGN PATENT DOCUMENTS

| | | |
|---|---|---|
| JP | 04-010733 | 1/1992 |
| JP | 04-352054 | 12/1992 |
| JP | 05-160815 | 6/1993 |
| JP | 05-204801 | 8/1993 |
| JP | 5-211514 | 8/1993 |
| JP | 6-177912 | 6/1994 |
| JP | 07-074785 | 3/1995 |
| JP | 09-034818 | 2/1997 |
| JP | 9-200217 | 7/1997 |
| JP | 11-261649 | 9/1999 |
| JP | 2001-268159 | 9/2001 |
| JP | 2001-339462 | 12/2001 |
| JP | 2002-026965 A | 1/2002 |
| JP | 2002-232461 A | 8/2002 |

OTHER PUBLICATIONS

Office Action dated May 19, 2006.

Chinese Office Action dated Nov. 21, 2008, with English Translation, issued in Chinese Patent Application No. CN 03812479.3.

Japanese Notification of Reason(s) for Refusal, w/ English translation thereof, issued in Japanese Patent Application No. JP 2007-068273 dated Apr. 21, 2009.

Chinese Office Action, w/ English translation thereof, issued in Chinese Patent Application No. CN 038124793 dated May 15, 2009.

Chinese Office Action, with English translation, issued in Chinese Patent Application No. 03812479.3, mailed Aug. 21, 2009.

Japanese Notification of Reason(s) for Refusal, w/ English translation thereof, issued in Japanese Patent Application No. JP 2007-068273 dated Nov. 17, 2009.

Japanese Notification of Reason(s) for Refusal, w/ English translation thereof, issued in Japanese Patent Application No. JP 2007-068273 dated Mar. 2, 2010.

* cited by examiner

US 7,843,968 B2

COMMUNICATION APPARATUS AND APPLICATIONS THEREOF

CROSS-REFERENCE TO RELATED APPLICATIONS

This application is a continuation application and claims the priority benefit of Patent Cooperation Treaty Application Number PCT/JP03/12166, filed on Sep. 24, 2003, which in turn claims the priority benefits of Japanese Patent Application Number JP2002-287870, filed on Sep. 30, 2002, Japanese Patent Application Number JP2002-315085, filed on Oct. 29, 2002, Japanese Patent Application Number JP2003-005100, filed on Jan. 10, 2003, and Japanese Patent Application Number JP2003-005101, filed on Jan. 10, 2003.

BACKGROUND OF THE INVENTION

1. Field of the Invention

The present invention relates to a communication technology and, more particularly, to a technology for efficiently processing a packet, a technology for efficiently processing data communication using a plurality of communication protocols and a technology for calculating a checksum of a packet transmitted or received over a network.

2. Description of the Related Art

With the contemporary widespread use of the Internet and on-going improvement in network infrastructure, much attention is drawn to Internet phone apparatuses capable of transmitting and receiving data packets obtained by coding a speech audio signal over a network such as the Internet. An Internet phone apparatus may be used as a video phone apparatus by transmitting video images concurrently with speech audio. Accordingly, Internet phone apparatuses are expected to replace existing telephone apparatuses to become next-generation telephone apparatuses.

Currently, Transmission Control Protocol/Internet Protocol (TCP/IP) is widely used as a communications protocol for packet communication. TCP is a communications protocol that places importance on accuracy by, for example, transmitting and receiving data only when connection between apparatuses is established. However, the orthodox approach involves complex processes and accompanied by timing-related constraints in which subsequent packets cannot be sent unless reception of a given packet is acknowledge by the party at the other end of the line. Due to a lack in real-time response, the orthodox approach is not suitable for transmission and reception of speech audio.

User Datagram Protocol/Internet Protocol (UDP/IP) is known as a communications protocol simpler than TCP. In UDP, it is not necessary to establish connection between apparatuses prior to data transmission and reception. Since there is no need to wait for acknowledgement of packets to send subsequent packets, the transmitting end is permitted to send packets on a continuous basis. For this reason, the protocol is suitable for transmission and reception of speech audio in which real-time response is more appreciated than data accuracy.

In apparatuses that support both TCP and UDP, packets are generally subject to software processes that use a general-purpose processor such as a CPU. More specifically, when a network interface device receives packets, packets addressed to Media Access Control (MAC) addresses other than that of the apparatus to which the device is connected are filtered out. The packets that passed the subsequent error check using Cyclic Redundancy Check (CRC) are sent to the CPU for processing.

Problems with an approach in which the entirety of packets are subject to software processes using the CPU are, for example, poor processing efficiency, low speed and large power consumption. Especially, in speech communication with a plurality of parties or in transmission of images in addition to audio, real-time response suffers since protocol-related processes determine the processing speed. Since the CPU continues to execute protocol-related processes during speech communication, it is difficult to execute other applications concurrently. When a high-performance apparatus with a CPU installed such as a personal computer is used for communication, no serious problem arises as a result of the CPU taking care of the entire packet-related processes, since the performance of such an apparatus matches the required task. In developing an apparatus dedicated to Internet phone, there is no other choice but to install a CPU of relatively low performance in order to meet requirements for miniaturization, low cost and low power consumption of the apparatus. Accordingly, a task to be challenged is to reduce the processing load imposed on a CPU. Increasing the performance of a CPU for improvement in processing speed results in an increase in the cost, power consumption and generated heat. Therefore, a compromise solution must be found by sacrificing some of the requirements.

In some apparatuses such as network routers, in which high-speed is demanded, the entirety of protocol-related processes are hardware implemented. In an approach in which both protocols are processed by hardware, high-speed protocol-related processes are possible. There are problems, however, in that the circuit scale, cost, power consumption and generated heat are increased as a result of hardware implementation of complex TCP-related processes.

In TCP and UDP, data are packetized before transmission and reception. In order to check the integrity of received data, each packet is assigned a checksum. A checksum is a result of one's complement addition of the entire packet data and is stored in a header of a packet. The transmitting end calculates a sum of the entire packet data prior to transmission so as to calculate a checksum, which is then stored in a header for transmission. The receiving end receiving the packet calculates a sum of the entire packet data and checks whether the result matches the checksum stored in the header. If they match, the receiving end determines that the packet reception is successful. If they do not, the receiving end determines that there is an error in the received packet and discards the packet.

In the case of TCP, the amount of data that can be transmitted in one session varies depending on the status of network and of a buffer at the receiving end. The amount of data transmitted is determined immediately prior to transmission. For this reason, the transmitting end reads out packet data to be transmitted and calculates a checksum only after the size of that data is determined. The checksum is then stored in the packet header. After the header information is transmitted, subsequent data are read out and transmitted.

Japanese Laid-Open Patent Publication No. 2001-268159 discloses a method for generating TCP packets. In this method, data transmitted using TCP are stored in a TX buffer. When the size of packet to be transmitted is determined, data of that size are read out from the TX buffer and a checksum is calculated. The data thus read out is stored in a temporary buffer. After the header that includes the checksum is transmitted, the data are read out from the temporary buffer and transmitted. By providing two memories, data read-out from the TX buffer for checksum calculation and data read-out from the temporary buffer for data transmission can take place concurrently. Pipelining of the read-out operations facilitates improvement in overhead.

Even with this approach, however, a problem remains in that a checksum is calculated only after the size of packet to be transmitted is determined and a relatively long delay occurs before the packet is transmitted. Another problem is that, since two memories physically separate from each other are necessary, the hardware scale and manufacturing cost are increased.

SUMMARY OF THE INVENTION

The present invention is done in view of the problems discussed above and its object is to provide a technology capable of efficiently processing packets in data communication.

The present invention is implemented in one mode by a communication apparatus. The communication apparatus according to this mode comprises: a receiving section for receiving packets transmitted via a network; a general-purpose circuit for subjecting the packets to software processes if the received packets are packets transmitted using a first communications protocol requiring establishment of connection between apparatuses prior to transmission and reception of data; and a dedicated circuit for processing the packets transmitted using a second communications protocol not requiring establishment of connection between apparatuses.

Another mode of implementation is also a communications apparatus. The communication apparatus according to this mode comprises: a receiving section for receiving packets transmitted via a network; a general-purpose circuit for subjecting the packets to software processing if the received packets are packets transmitted using a first communications protocol requiring acknowledgement of transmitted packets; and a dedicated circuit for processing the packets transmitted using a second communications protocol not requiring acknowledgement of transmitted packets.

The general-purpose circuit may be a CPU or DSP, for example. The first communications protocol may be TCP, for example. The second communications protocol may be UDP, for example. By using hardware for processing UDP packets, the circuit scale is prevented from growing and the speed for UDP processes is increased.

The communication apparatus may further comprise: a transmitting section for transmitting packets via a network, wherein if packets for transmission are transmitted using the first communications protocol, the packets are processed by the general-purpose circuit, and if packets for transmission are transmitted using the second communications protocol, the packets are processed by the dedicated circuit.

The communication apparatus may further comprise a detecting section for identifying a communications protocol used for transmission of the received packets. The detecting section may refer to a packet header to identify a communications protocol. The detecting section may be constructed of a dedicated circuit.

When the detecting section detects packets transmitted using the first communications protocol, the detecting section sends the packets to the dedicated circuit bypassing the general-purpose circuit. By allowing the dedicated circuit to process packets without depending on software processing, high-speed processing is realized. Further, the processing load imposed on the general-purpose circuit such as the CPU is reduced.

The communications apparatus may further comprise a security processing section for encrypting or decrypting data constituting the packets. The security processing section may also be constructed of a dedicated circuit.

Another mode of implementation of the present invention is also a communications apparatus. The communication apparatus of this mode comprises: a receiving section for receiving packets transmitted via a network; and a first determination section for transferring, when received packets are fragmented packets, the received packets to a general-purpose circuit for software processing, and transferring, when received packets are non-fragmented packets, the received packets to a first dedicated circuit for hardware processing.

IP packets with an option of fragmented IP packets require complex processing so that an attempt to process these IP packets by a dedicated circuit invites an increase in the circuit scale, power consumption and cost. By allowing a dedicated circuit to process normal IP packets at a high speed and subjecting special IP packets requiring more complex processing than the normal IP packets to software processing using a general-purpose circuit such as a CPU, the circuit scale of the dedicated circuit is prevented from growing and the poser consumption and cost are reduced.

The communication apparatus may further comprise: a second determination section for transferring, when the packets processed by the first dedicated circuit are packets transmitted using a first communications protocol requiring establishment of connection between apparatuses, the packets to the general-purpose circuit, and transferring, when the packets processed by the first dedicated circuit are packets transmitted using a second communications protocol not requiring establishment of connection between apparatuses, the packets to a second dedicated circuit for hardware processing.

A determination as to whether the packet is a UDP packet or a TCP packet may be made after IP-related processes for the normal IP packets are executed by the IP processing circuit so that only UDP packets are processed by the UDP processing circuit and TCP packets are subject to software processing using the CPU or the like.

Another mode of implementation of the present invention is also a communications apparatus. The communication apparatus of this mode comprises: a determination section for determining whether packets received via a network include data requiring real-time processing or not; a buffer for temporarily storing the packets; and a control section for controlling storage of the packets in the buffer, wherein the control section permits storage of the packets including data requiring real-time processing in the buffer and prohibits storage of packets not including data requiring real-time processing in the buffer, when a free area available in the buffer falls below a predetermined threshold level.

By importing and processing packets requiring real-time processing in preference to other packets, the likelihood of the buffer saturating and the packets requiring real-time processing being discarded is reduced.

Another mode of implementation of the present invention is also a communications apparatus. The communication apparatus of this mode comprises: a determination section for determining whether packets received via a network are packets transmitted using a first communications protocol requiring establishment of connection between apparatuses prior to transmission and reception of data, or packets transmitted using a second communications protocol not requiring establishment of connection between apparatuses; a buffer for temporarily storing the packets; and a control section for controlling storage of the packets in the buffer, wherein the control section permits storage of the packets transmitted using the second communications protocol in the buffer and prohibits storage of packets transmitted using the first communications protocol in the buffer, when a free area available in the buffer falls below a predetermined threshold level.

By selectively importing UDP packets in preference to TCP packets when a speech audio signal in a telephone apparatus or a video signal in a video phone apparatus is transmitted and received using UDP, the likelihood of the UDP packets being discarded and data such as the speech audio signal are lost is reduced.

Another mode of implementation of the present invention is also a communications apparatus. The communication apparatus of this mode comprises: a determination section for determining a type of packets received via a network; a buffer for temporarily storing the packets; and a control section for controlling storage of the packets in the buffer, wherein the control section stores a plurality of threshold levels corresponding to packet types for determination of permission or prohibition of storage of the packets in the buffer, and prohibits storage in the buffer of the packets of a packet type for which the free area available in the buffer falls below the threshold level.

The threshold level for a type of packets requiring real-time processing may be configured to be lower than the threshold level for a type of packets not requiring real-time processing. With this, it is possible to import packets requiring real-time processing or important packets in preference to other packets when the free area in the buffer becomes small.

Another mode of implementation of the present invention is a telephone apparatus. The telephone apparatus of this mode comprises: an input section for receiving audio input; a communications section for transmitting the audio input via the input section to other apparatuses, and receiving the audio from other apparatuses; and an output section for outputting the audio received from other apparatuses, wherein the communications section comprises: a receiving section for receiving packets transmitted via a network; and a detecting section for detecting a communications protocol for received packets, wherein a general-purpose circuit for subjecting the packets to software processes if the communications protocol is a first communications protocol requiring establishment of connection between apparatuses prior to transmission and reception of data, a dedicated circuit for processing the packets if the communications protocol is a second communications protocol not requiring establishment of connection between apparatuses, and the audio is transmitted and received using the second communications protocol.

The output section may be a speaker and the input section may be a microphone.

Another mode of implementation of the present invention is a video phone apparatus. The video phone apparatus of this mode comprises: an input section for receiving audio and image input; a communications section for transmitting the audio and image input via the input section to other apparatuses, and receiving the audio and image from other apparatuses; and an output section for outputting the audio and image received from other apparatuses, wherein the communications section comprises: a receiving section for receiving packets transmitted via a network; a detecting section for detecting a communications protocol for received packets, wherein a general-purpose circuit for subjecting the packets to software processes if the communications protocol is a first communications protocol requiring establishment of connection between apparatuses prior to transmission and reception of data, a dedicated circuit for processing the packets if the communications protocol is a second communications protocol not requiring establishment of connection between apparatuses, and the audio and image are transmitted and received using the second communications protocol.

Another mode of implementation of the present invention is an image pickup apparatus. The image pickup apparatus may comprise: an image pickup section for picking up images; and a communications section for transmitting the image picked up by the image pickup section to other apparatuses, and receiving the image from other apparatuses, wherein the communications section comprises: a receiving section for receiving packets transmitted via a network; a detecting section for detecting a communications protocol for received packets, wherein a general-purpose circuit for subjecting the packets to software processes if the communications protocol is a first communications protocol requiring establishment of connection between apparatuses prior to transmission and reception of data, a dedicated circuit for processing the packets if the communications protocol is a second communications protocol not requiring establishment of connection between apparatuses, and the image is transmitted and received using the second communications protocol.

Another mode of implementation of the present invention is a communications method. The communications method of this mode comprises the steps of: detecting a communications protocol for received packets; and transferring the packets to a circuit for processing the packets in accordance with the communications method.

The step of detecting may determine whether a packet is a fragmented or non-fragmented packet by analyzing a header of the packet, and the step of transferring includes transferring the fragmented packet to a general-purpose circuit for software processing and transferring the non-fragmented packet to a dedicated circuit for processing such packets.

The step of detecting may include determining whether packets received are packets according to a first communications protocol requiring establishment of connection between apparatuses prior to transmission and reception of data, or packets according to a second communications protocol not requiring establishment of connection between apparatuses, the step of transferring includes transferring packets according to the first communications protocol to a general-purpose circuit for software processing and transferring packets according to the second communications protocol to a dedicated circuit for processing such packets.

Data not requiring real-time processing may be transmitted and received using the first communications protocol and stream data requiring real-time processing may be transmitted and received using the second communications protocol. Data requiring real-time processing are data with time constraints. Data not requiring real-time processing are data without time constraints. Stream data may be speech audio data, video data or the like.

Another mode of implementation of the present invention is a communications method. The communications method of this mode comprises the steps of: detecting a packet type when a packet is received; determining whether storage of the packet in a buffer for temporarily storing packets is permitted or not, on the basis of criteria set up for respective packet types; storing the packet in the buffer when storage is permitted; and discarding the packet when storage is not permitted.

Another mode of implementation of the present invention is a packet processing apparatus. The packet processing apparatus of this mode comprises: a buffer for temporarily storing packets retrieved via a network; a write control section for controlling storage of the packets in the buffer, wherein the write control section discards destination address information included in header information of the packets before storing the packets in the buffer.

Destination MAC addresses stored in the MAC header of packet are not necessary for subsequent packet processes once the packets are received. By discarding the destination MAC addresses, the efficiency in use of the buffer is improved.

The write control section may store, in place of the destination address information, management information including transmission type information indicating whether a packet is transmitted using unicast, multicast or broadcast.

The management information may further include packet type information indicating a packet type and address information indicating a location of storage of a subsequent packet.

The write control section may fit the management information in one word and shapes subsequent data so as to fit a word configuration before storing the information and data in the buffer.

The MAC header is as long as 3.5 words in a 32-bit word configuration so that misalignment occurs. By storing the MAC header in a buffer unshaped, the subsequent data continue to be misaligned by half word. By discarding the destination 1.5-word long MAC address before storage in the buffer, it is ensured that the subsequent data aligned in the word configuration. Management information of 1 word length necessary for packet processes may be added. With this, both hardware handling and software handling are simplified.

Another mode of implementation of the present invention is a packet processing apparatus. The packet processing apparatus of this mode comprises: a buffer for temporarily storing the packets retrieved via a network; and a read control section for controlling reading of the packets from the buffer, wherein independent registers are assigned to header portions of the packets to enable random access, while data portions of the packets are read from the buffer via an access port register.

The header information should be read so that the CPU determines a destination. Therefore, it is ensured that independent registers are assigned to the header information for ease of access. With regard to the data portion, once the destination of data is determined, the remaining task is to copy data. By employing the access port registers, access without depending on management is enabled.

The read control section may set a location at which a read operation by the access port register starts, in accordance with a type of packet read. For example, in the case of MAC packets, the location is automatically set at the head of the MAC data. In the case of IP data, the location is set at the head of the IP data. With this, the processing load imposed on the CPU is further reduced.

The packet processing apparatus may further comprise: a header analyzing section analyzes header information of packets so as to discard unnecessary packets, before storing packets in the buffer; and a checksum calculating section calculates a checksum of a packet before storing the packet in the buffer so as to determine whether the calculated checksum matches a checksum stored in the header.

With this, the CPU may execute processes on an assumption that the packets stored in the buffer are legitimate packets.

Another mode of implementation of the present invention is a telephone apparatus. The telephone apparatus of this mode comprises: an input section for receiving audio input; a communications section for transmitting the audio input via the input section to other apparatuses, and receiving the audio from other apparatuses; and an output section for outputting the audio received from other apparatuses, wherein the communications section comprises: a receiving section for receiving packets transmitted via a network; and a packet processing section for processing the received packets, and wherein the packet processing section comprises: a buffer for temporarily storing the packets; and a write control section for controlling storage of the packets in the buffer, and wherein the write control section discards destination address information included in header information of the packets before storing the packets in the buffer.

Another mode of implementation of the present invention is also a telephone apparatus. The telephone apparatus of this mode comprises: an input section for receiving audio input; a communications section for transmitting the audio input via the input section to other apparatuses, and receiving the audio from other apparatuses; and an output section for outputting the audio received from other apparatuses, wherein the communications section comprises: a receiving section for receiving packets transmitted via a network; and a packet processing section for processing the received packets, and wherein the packet processing section comprises: a buffer for temporarily storing the packets; and a read control section for controlling reading of the packets from the buffer, and wherein independent registers are assigned to header portions of the packets to enable random access, while data portions of the packets are read from the buffer via an access port register.

Another mode of implementation of the present invention is a packet processing method. The packet processing method of this mode comprises the steps of: temporarily storing received packets in a buffer; and discarding destination address information included in header information of the packets before storing the packets in the buffer.

Another mode of implementation of the present invention is a checksum calculating method. The checksum calculating method of this mode comprises the step of: calculating accumulated checksums at predetermined intervals in a data unit including a data block, from the head of the data unit to the end thereof, a data size of the data block being determined at a predetermined timing, in order to assign a checksum to the data block prior to the timing; and storing the accumulated checksums in a storage.

The data block may be a TCP payload. The data size of TCP packet is determined when the packet is ready for transmission. By storing accumulated checksums at predetermined intervals, the checksum of the packet is calculated in a short time when the data size is determined, using the accumulated checksums before and after the data block.

Accumulated checksums before and after the data block may be read from the storage once the data size of the data block is determined, so as to calculate the checksum for the data block.

The accumulated checksum for data immediately preceding the data block, and the accumulated checksum for the last data in the data block may-be read from the storage, and the checksum for the data block may be calculated as a difference between the accumulated checksums thus read.

Another mode of implementation of the present invention is also a checksum calculating method. The checksum calculating method of this mode comprises the step of: dividing a data unit including a data block into predetermined intervals prior to a timing when a data size of the data block is determined, in order to assign a checksum to the data block; and calculating checksums for the intervals and storing the calculated checksums in a storage.

The data size of the data block may be controlled to be an integral multiple of a unit length of the intervals.

Another mode of implementation of the present invention is a checksum recording method. The checksum recording method of this mode comprises the step of: calculating checksums for a data unit from the head of the data unit to the end thereof, at a plurality of locations in the data unit; and holding the calculated checksums.

Even when the size of data unit is large, an error occurring near the head of the data unit is detected without calculating the checksum of the whole data unit, by recording interim checksum calculation results at a plurality of locations.

Another mode of implementation of the present invention is a communications apparatus. The communications apparatus of this mode comprises: an input section receiving input of a data unit; a calculating section for calculating accumulated checksums from the head of the data unit to the end thereof; and a holding section for holding the accumulated values at predetermined intervals of the data unit.

The communications apparatus may further comprise: an output section dividing the data unit into a plurality of data blocks and transmitting the same via a network; a control section for controlling a size of the data block to be transmitted subsequently; and a second calculating section for retrieving the size of the data block to be transmitted subsequently, and reading the accumulated checksums before and after the data block from the holding section so as to calculate a checksum for the data block.

The holding section may hold accumulated checksums from the head of the data unit and at predetermined intervals, when the data unit is transmitted using a communications protocol in which the size of the data block to be transmitted is not determined, and hold the checksum for the data unit as a whole, when the data unit is transmitted using a communications protocol in which the size of the data block to be transmitted is predetermined.

The communications protocol in which the size of the data block to be transmitted is not determined may be TCP, and the communications protocol in which the size of the data block to be transmitted is predetermined may be UDP.

Optional combinations of the aforementioned constituting elements, and implementations of the invention in the form of methods, apparatuses and systems may also be practiced as additional modes of the present invention.

This summary of the invention does not necessarily describe all necessary features so that the invention may also be a sub-combination of these described features.

BRIEF DESCRIPTION OF THE DRAWINGS

The object described above, other objects, characteristics and advantages will be appreciated by referring to the preferred embodiments and associated drawings.

DETAILED DESCRIPTION OF THE INVENTION

The invention will now be described based on the preferred embodiments. This does not intend to limit the scope of the present invention, but exemplify the invention.

First Embodiment

Figure 1:
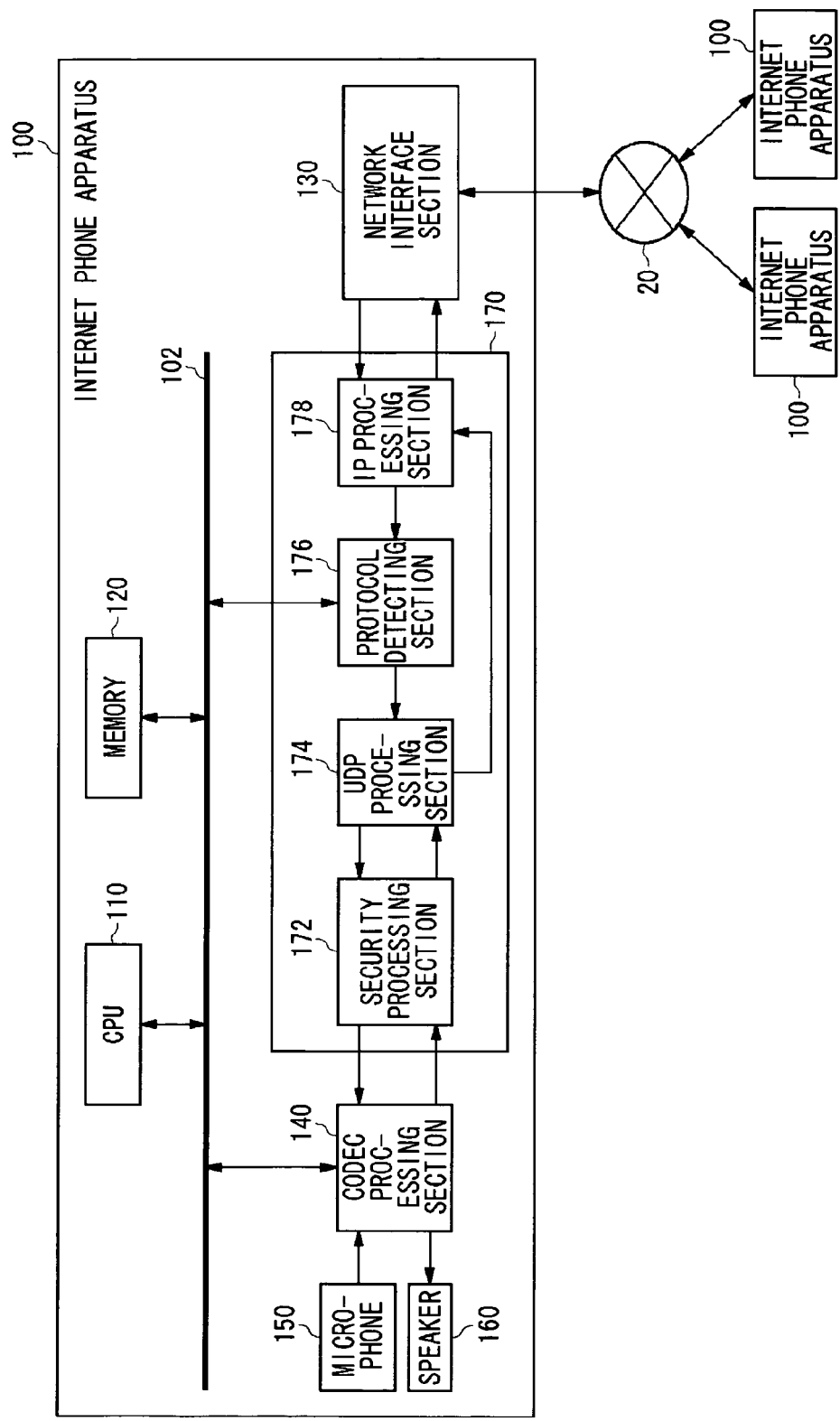
FIG. 1 shows an overall construction of an Internet phone apparatus, an example of communications apparatus according to a first embodiment.

FIG. 1 shows an overall construction of an Internet phone apparatus 100, an example of communications apparatus according to a first embodiment of the present invention. The Internet phone apparatus 100 is an apparatus for speech communication with the other Internet phone apparatus 100 over the Internet 20. The Internet phone apparatus 100 comprises: a CPU 110, a general-purpose circuit for executing software processes; a memory 120 used as a program area or a work area; a network interface section 130 for transmitting and receiving packets over the Internet 20; a microphone 150 for receiving an audio input; a speaker 160 for outputting an audio signal; a codec processing section 140 for compression coding and decoding of the audio signal; a protocol processing section 170 for executing various processes adapted to communications protocols; and a bus 102 for electrically connecting the listed sections.

The Internet phone apparatus 100 according to the first embodiment transmits and receives an audio signal using UDP as a transport layer communications protocol. UDP does not require establishment of connections and is capable of sending out packets continuously. Therefore, protocol-related processes are simplified and high-speed communication is enabled. For this reason, UDP is suitable for real-time communication such as transmission of speech audio. In the Internet phone apparatus 100 according to the first embodiment, the protocol processing section 170 is dedicated to the task of processing UDP packets. In this way, the processing speed is further improved so that real-time transmission and reception of-speech audio is enabled.

TCP packets transmitted and received by the Internet phone apparatus 100 are subject to software processes that use the CPU 110. For TCP that does not require real-time response, no dedicated circuits are provided and only software processes are executed by a general-purpose circuit. In this way, the circuit scale is prevented from being increased, and an increase in the cost, power consumption and generated heat is minimized. According to an estimate made by the inventors of the present invention, the circuit area and power consumption are reduced to approximately /1;3 of that of a configuration in which both TCP and UDP are processed by dedicated circuits.

Packets received by the network interface section 130 are sent to an IP processing section 178 of the protocol processing section 170. The IP processing section 178 determines whether the packet is destined to an IP address assigned to the host it belongs to. The IP processing section 178 forwards only legitimate packets to a protocol detecting section 176. For detection of a protocol type, the protocol detecting section 176 refers to PROT in an IP header attached to the packet and indicating a protocol type. Alternatively, the protocol detecting section 176 may refer to a TCP header or a UDP header. If the packet is a TCP packet, the protocol detecting section 176 forwards the packet data to the bus 102 for software processing by the CPU 110. If the packet is a UDP packet, the protocol detecting section 176 forwards the packet data to the UDP processing section 174 for processing by a circuit dedicated to processing of UDP data.

The UDP processing section 174 is a circuit dedicated to processing of UDP packets. More specifically, the UDP processing section 174 receives UDP packets, analyzes the header and executes necessary processes. A security processing section 172 executes processes such as decoding of encrypted data when security measures such as encryption are introduced in the data. The decoded data are forwarded to the codec processing section 140. The codec processing section 140 decodes compression coded data to retrieve a speech audio signal and outputs the signal to the speaker 160.

As described above, according to the Internet phone apparatus 100 of the first embodiment, speech audio data requiring real-time response rather than accuracy and continuous processing during a speech communication session are transmitted and received using UDP. The UDP processing section 174, a dedicated circuit, is responsible for hardware processes. Data that require accuracy rather than real-time response are transmitted using TCP and subject to software processes using the CPU 110. With this, it is possible to reduce the complexity of circuit, circuit scale, cost, power consumption and generated heat, while improving the speed in processing speech audio data. These advantages will be more easily appreciated when processing a large amount of data simultaneously, i.e., when communicating with a plurality of parties, or when images are transmitted and received in addition to speech audio. By using the protocol detecting section 176 to detect a packet type, it is possible to select a packet processing entity promptly and appropriately. The processing load imposed on the CPU 110 is reduced so that the cost and power consumption are reduced. As the resources of the CPU 110 may be turned to other uses, it is possible to execute other applications so that new services may be provided.

Described above is an operation executed when packets are received. A description will now be given of an operation executed when an audio signal input via the microphone 150 is packetized for transmission. The audio signal input via the microphone 150 is forwarded to the codec processing section 140 for encoding. The encoded signal is encrypted as required by the security processing section 172 and then forwarded to the UDP processing section 174, where the signal is packetized and a UDP header is attached. The UDP packet is sent to the Internet 20 via the network interface section 130.

Figure 2:
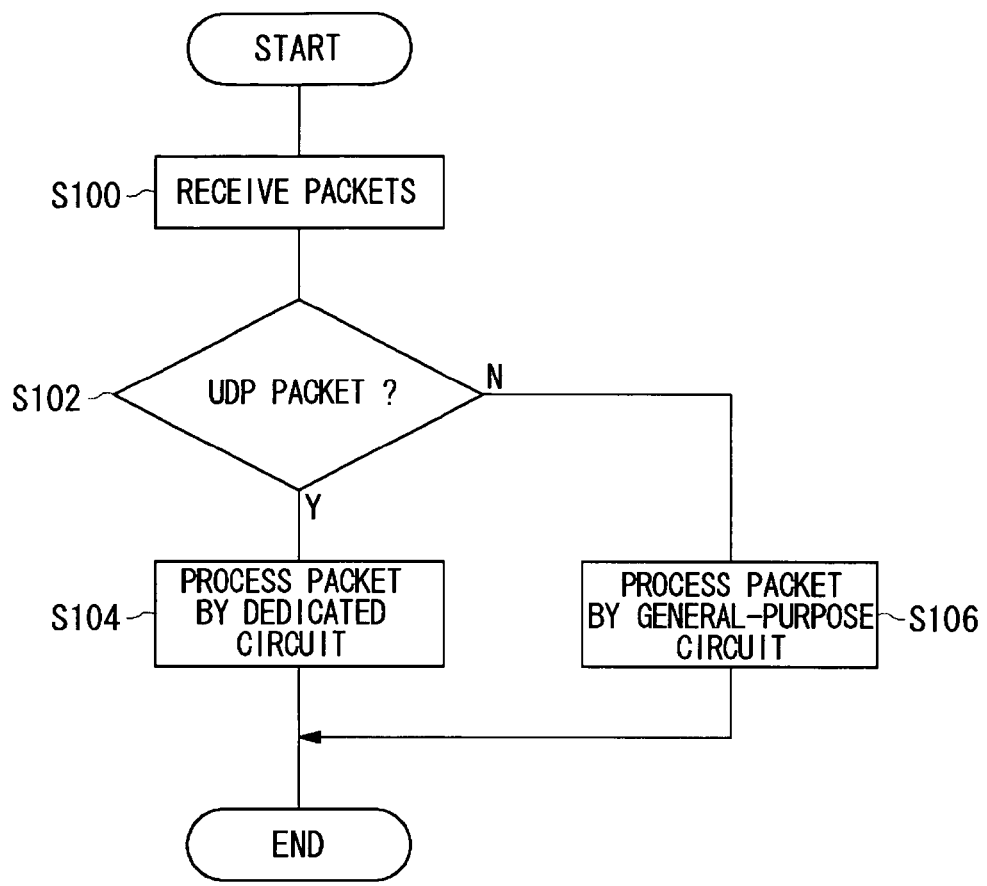
FIG. 2 is a flowchart showing a procedure involved in a communications protocol according to the first embodiment.

FIG. 2 is a flowchart showing a procedure involved in a communications protocol according to the first embodiment. When the network interface section 131 receives a packet (S100), the IP processing section 178 executes necessary processes, whereupon the protocol detecting section 176 determines whether a UDP packet or a TCP packet has arrived (S102). If it is determined that a UDP packet has arrived (Y of S102), the UDP processing section 174, a circuit dedicated to processing of UDP packets, processes the packet (S104). If it is determined that a TCP packet has arrived (N of S102), the CPU 110, a general-purpose circuit, processes the packet (S106). Subsequently, necessary processes are performed depending on the data type.

In this embodiment, a description was given using a telephone apparatus as an example. The technology of the first embodiment is also applicable to communication equipment in general that transmits and receives stream data, such as a computer and a portable phone.

Circuits having the functions of the IP processing section 178, the protocol detecting section 176 and the UDP processing section 174 may be built on a single semiconductor substrate. Further, the security processing section 172, the codec processing section 140 and the CPU 110 may be built in the circuits. With this, miniaturization, light-weight and high-speed processing of the communication apparatus are achieved.

According to the first embodiment, data communication using a plurality of communications protocol is processed efficiently. Moreover, high-speed, real-time communication is achieved using a relatively simple circuit configuration.

Second Embodiment

Figure 3:
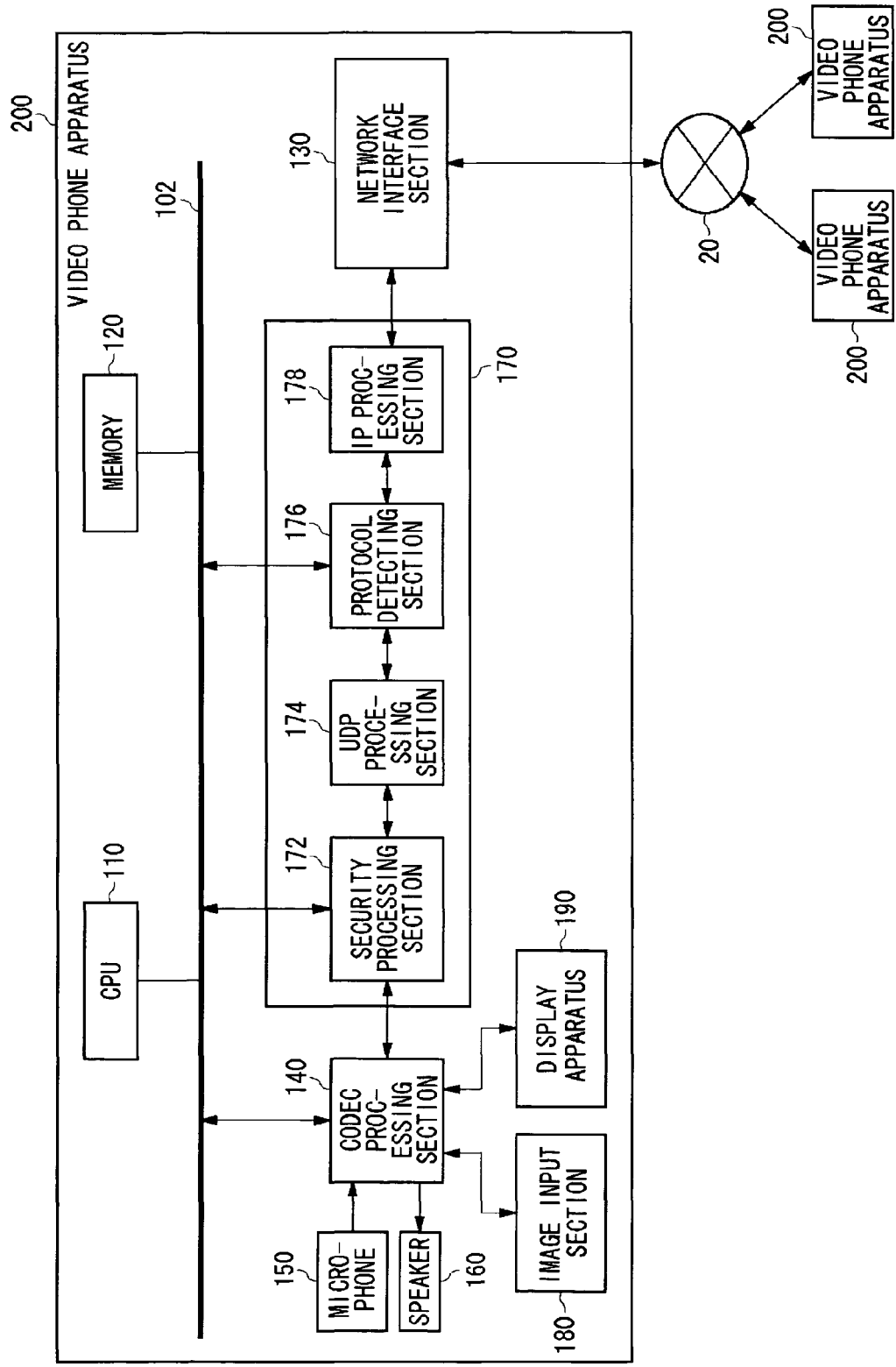
FIG. 3 shows an overall construction of a video phone apparatus, an example of communication apparatus according to a second embodiment.

FIG. 3 shows an overall construction of a video phone apparatus 200, an example of communication apparatus according to a second embodiment. In addition to the components of the Internet phone apparatus 100 shown in FIG. 1, the video phone apparatus 200 according to the second embodiment comprises an image input section 180, an example of input section, and a display apparatus 190, an example of output section. The other aspects of the construction are the same as the corresponding aspects of the first embodiment. Like components are denoted by like reference symbols. In the second embodiment, image data are also transmitted and received using UDP.

The image input section 180 receives images to be transmitted to the party at the other end together with speech audio. The image input section 180 may receive images from an external camera or video playback apparatus. Alternatively, the image input section 180 may operate as an image pickup apparatus for picking up images. The input images are directly sent to the codec processing section 140 for encoding. The UDP processing section 174 shapes the encoded result into UDP packets. The network interface section 130 sends the packets to the Internet 20. The display apparatus 190 displays images received from the party at the other end together with speech audio. The image data included in the UDP packets received by the network interface section 130 are processed by the UDP processing section 174, the security processing section 172 and the codec processing section 140. The codec processing section 140 directly sends the image data to the display apparatus 190 for display.

Third Embodiment

Figure 4:
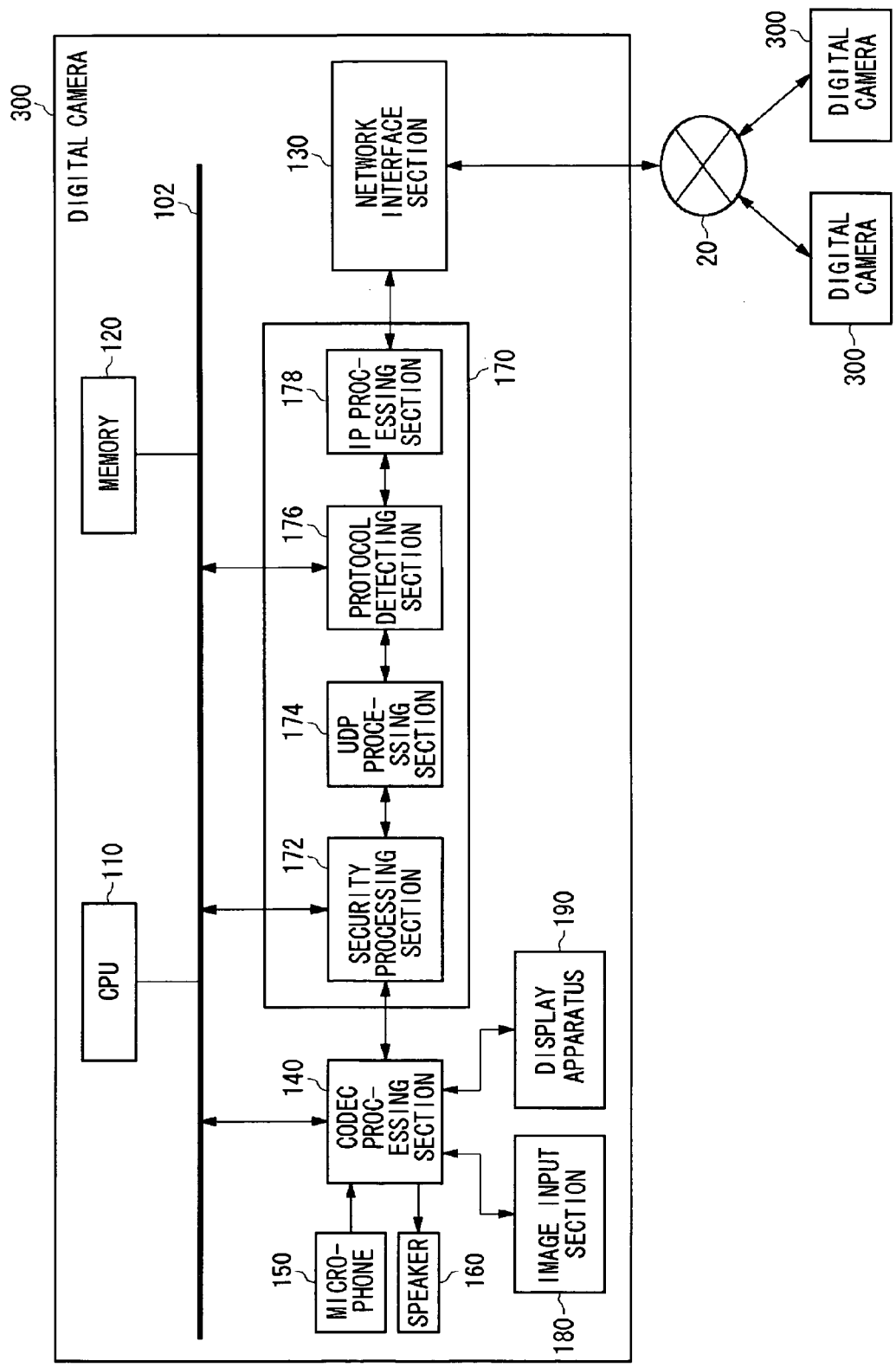
FIG. 4 shows an overall construction of a digital camera, an example communication apparatus according to a third embodiment.

FIG. 4 shows an overall construction of a digital camera 300, an example communication apparatus according to a third embodiment. The digital camera 300 according to the third embodiment is provided with telephone communications functions. In addition to the components of the Internet phone apparatus 100 shown in FIG. 1, the digital camera 300 comprises an image pickup section 182 and a display apparatus 190. The other aspects of the construction are the same as the corresponding aspects of the first embodiment. Like numerals are denoted by like reference symbols.

The image pickup section 182 includes an image pickup element such as a CCD and a configuration for controlling the element. The image pickup section 182 picks up still or moving images. The images picked up are directly sent to the codec processing section 140 for encoding. The UDP processing section 174 shapes the encoded result into UDP packets. The network interface section 130 sends the packets to the Internet 20. The display apparatus 190 displays images received from the party at the other end together with speech audio. The image data included in the UDP packets received by the network interface section 130 are processed by the UDP processing section 174, the security processing section 172 and the codec processing section 140. The codec processing section 140 directly sends the image data to the display apparatus 190 for display.

Fourth Embodiment

Figure 5:
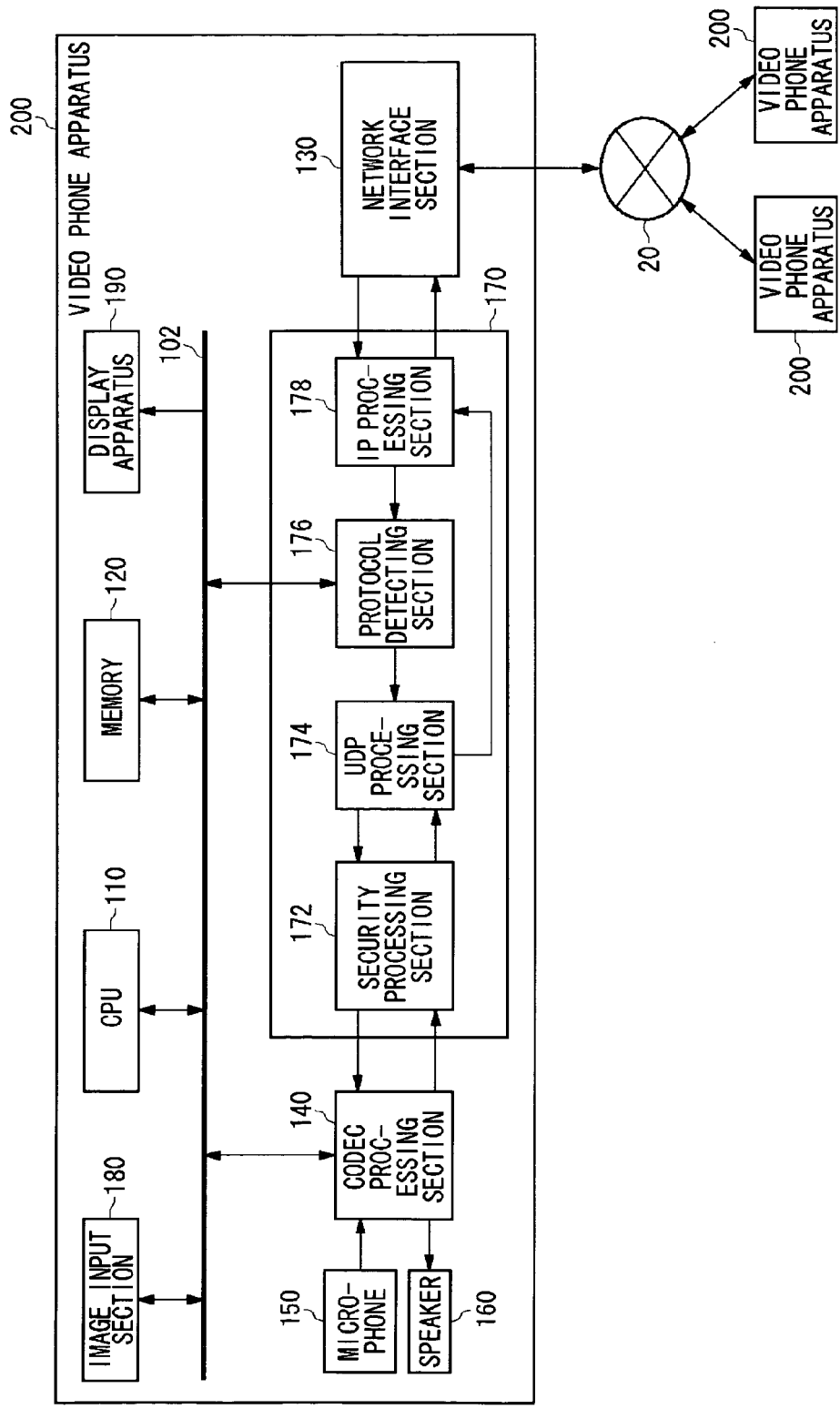
FIG. 5 shows an overall construction of a video phone apparatus, an example of communication apparatus according to a fourth embodiment.

FIG. 5 shows an overall construction of a video phone apparatus 200, an example of communication apparatus according to a fourth embodiment. The video phone apparatus 200 according to the fourth embodiment differs from the video phone apparatus 200 of the second embodiment shown in FIG. 3 in that the image input section 180 and the display apparatus 190 are not connected directly to the codec processing section 140 but to the bus 102. The other aspects of the construction are the same as the corresponding aspects of FIG. 3 and like components are denoted by like reference symbols.

Images received by the image input section 180 are stored in the memory 120. The images stored in the memory 120 are read out as required and encoded by the codec processing section 140. The UDP processing section 174 shapes the encoded image data into UDP packets. The network interface section 130 sends the packets to the Internet 20. The image data included in the UDP packets received by the network interface section 130 are processed by the UDP processing section 174, the security processing section 172 and the codec processing section 140 and sent to the display apparatus 190 for display.

Fifth Embodiment

Figure 6:
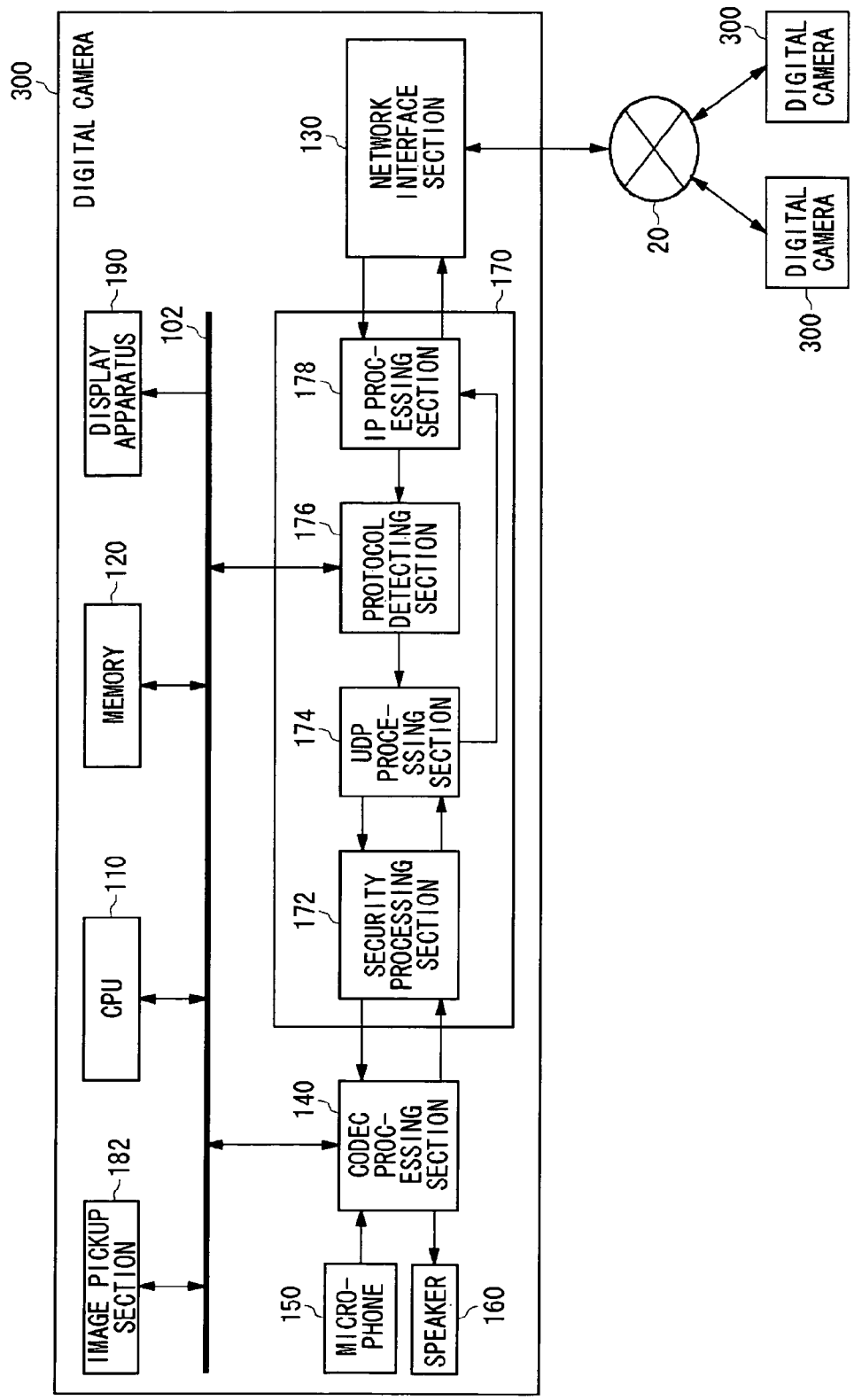
FIG. 6 shows an overall construction of a digital camera, an example of communication apparatus according to a fifth embodiment.

FIG. 6 shows an overall construction of a digital camera 300, an example of communication apparatus according to a fifth embodiment. The digital camera 300 according to the fifth embodiment differs from the digital camera 300 of the third embodiment shown in FIG. 4 in that the image pickup section 182 and the display apparatus 190 are not connected directly to the codec processing section 140 but to the bus 102. The other aspects of the construction are the same as the corresponding aspects of FIG. 4 and like components are denoted by like reference symbols.

Images picked up by the image pickup section 182 are stored in the memory 120. The images stored in the memory 120 are read out as required and encoded by the codec processing section 140. The UDP processing section 174 shapes the encoded image data into UDP packets. The network interface section 130 sends the packets to the Internet 20. The image data included in the UDP packets received by the network interface section 130 are processed by the UDP processing section 174, the security processing section 172 and the codec processing section 140 and sent to the display apparatus 190 for display.

Sixth Embodiment

Figure 7:
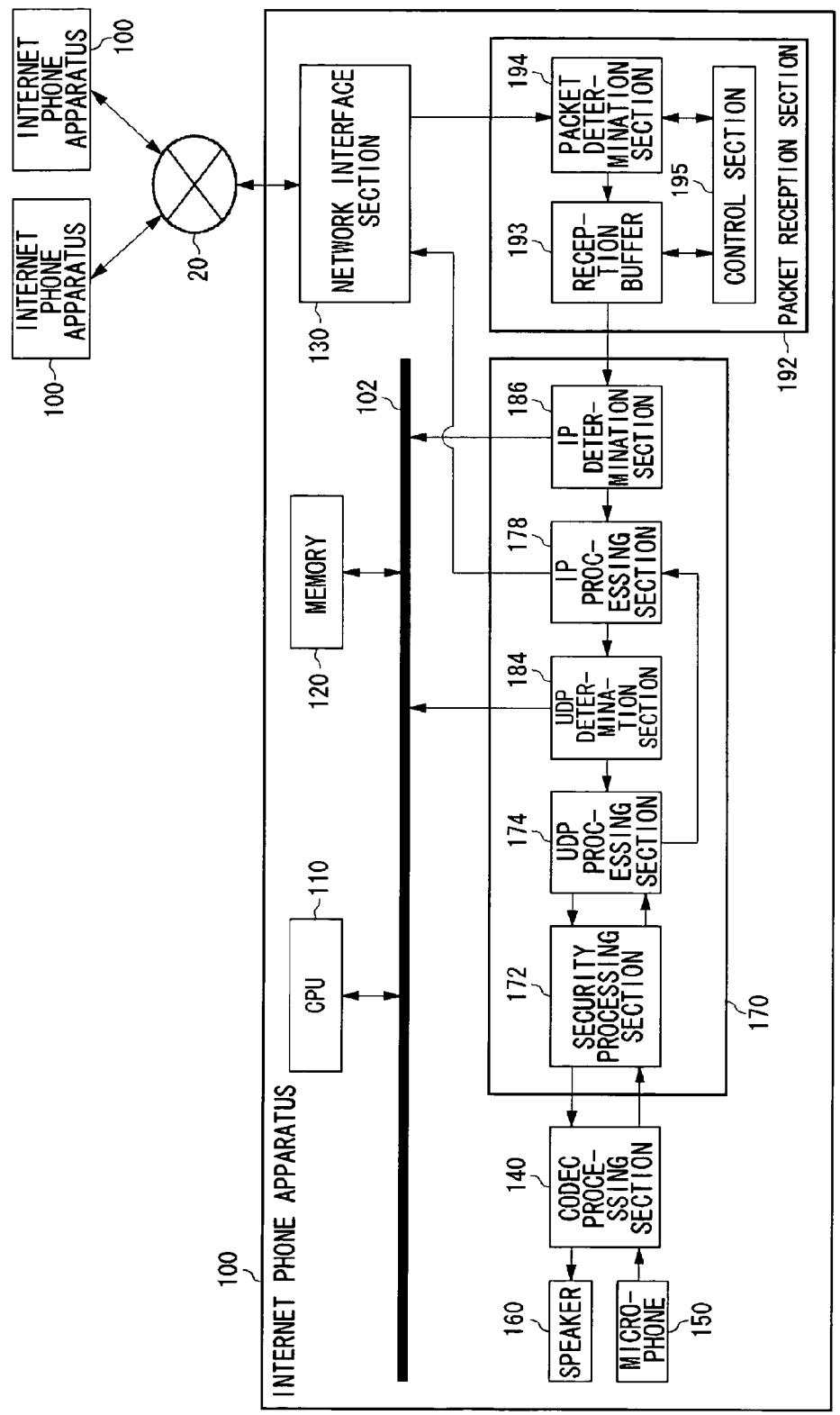
FIG. 7 shows an overall construction of an Internet phone apparatus, an example of communication apparatus according to a sixth embodiment.

FIG. 7 shows an overall construction of an Internet phone apparatus 100, an example of communication apparatus according to a sixth embodiment. In addition to the components of the Internet phone apparatus 100 according to the first embodiment shown in FIG. 1, the Internet phone apparatus 100 according to the sixth embodiment further comprises an IP determination section 186 and a packet receiving section 192. In stead of the protocol detecting section 176, there is provided a UDP determination section 184. The other aspects of the construction are the same as the corresponding aspects of FIG. 1 and like components are denoted by like reference symbols.

In a similar configuration as the first embodiment, the processing speed is improved by processing UDP packets including audio signals by dedicated hardware so that real-time transmission and reception of speech audio is achieved. The sixth embodiment further proposes a technology for improving real-time response.

The packet receiving section 192 stores packets including data that require real-time response in a reception buffer 193 in preference to other packets that do not require real-time response. When the size of free area available in the reception buffer 193 is below a predetermined threshold level, packets that do not require real-time response are prevented from being stored in the reception buffer 193 and only those packets that require real-time response are stored. This helps lower the likelihood of packets being discarded and data being damaged when the reception of packets requiring real-time response is delayed.

The IP determination section 186 examines IP packets to identify special packets that require complex processing. The IP determination section 186 forwards the packets thus identified to the CPU 110 for software processing and forwards normal IP packets to the IP processing section 178 for hardware processing. With this, the scale of hardware in the IP processing section 178 is prevented from being increased and becoming complicated, and the power consumption is prevented from being increased, while maintaining functions to process normal IP packets at a high speed using dedicated hardware. Details of the technology will be described later with reference to associated drawings.

Figure 8:
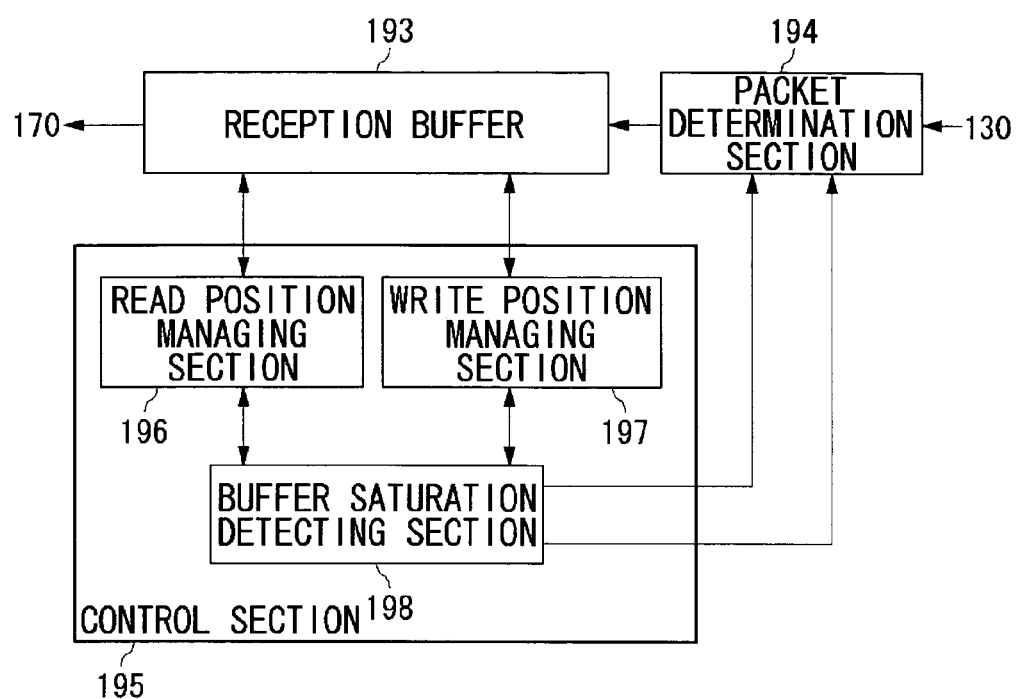
FIG. 8 shows an internal construction of a packet receiving section of the Internet phone apparatus according to the sixth embodiment.

FIG. 8 shows an internal construction of the packet receiving section 192. A control section 195 includes a read position managing section 196, a write position managing section 197 and a buffer saturation detecting section 198. The reception buffer 193 according to the sixth embodiment is constructed of first in first out (FIFO) memories. The read position managing section 196 is a register that holds a read address of the reception buffer 193. The write position managing section 197 is a buffer that holds a write address of the reception buffer 193. The buffer saturation detecting section 198 detects the size of used area of the reception buffer 193, by calculating a difference between the read address held in the read position managing section 196 and the write address held in the write position managing section 197 so as to monitor a free area available in the reception buffer 193.

The buffer saturation detecting section 198 holds a plurality of threshold levels for determination as to prevention of writing in the reception buffer 193. The threshold levels are set according to packet types. When the size of free area of the reception buffer 193 is below the threshold level for a given packet type, packets of that type are prevented from being written in the reception buffer 193 and the packets of that type already received are discarded.

In order to store packets that include data requiring real-time processing in the reception buffer 193 in preference to other packets, the threshold level for packets requiring real-time processing is configured to be lower than the threshold level for packets not requiring real-time processing. For example, it is assumed that the threshold level for packets requiring real-time processing is 0% of the buffer size and the threshold level for packets not requiring real-time processing is 50%. When the size of free area available in the reception buffer 193 falls below 50%, the buffer saturation detecting section 198 determines that the buffer saturates for packets not requiring real-time processing and prevents packets of that type from being written in the buffer, while determining that there still is a free area for packets requiring real-time processing and permits packets of that type to be written in the buffer. When the size of free area available in the reception buffer 193 is 50% or greater, both the packets requiring real-time processing and packets not requiring real-time processing are stored in the buffer 193. When the size falls below 50%, only those packets requiring real-time processing are allowed to be stored.

In this embodiment audio signals requiring real-time processing are transmitted and received using UDP. Accordingly, the packet determination section 194 determines whether a received packet is a TCP packet or a UDP packet. If the received packet is a TCP packet, a threshold level for packets not requiring real-time processing is employed. If the received packet is a UDP packet, a threshold level for packets requiring real-time processing is employed. The packet determination section 194 stores packets permitted for storage in the reception buffer 193 and discards packets prevented from storage.

In TCP, there is likelihood that a large amount of packets are received when, for example, a data file is transferred using the file transfer protocol (FTP). In this case, the reception buffer 193 may be saturated by TCP packets, preventing reception of UDP packets. UDP packets that include audio signals need to be played back on a real-time basis. Therefore, by ensuring that UDP packets use the reception buffer 193 in preference to other packets, loss of data due to discarding of packets is minimized. UDP is not designed for retransmission control. Therefore, packets once discarded are never retrieved. TCP, on the other hand, enables compensation for lost data by retransmission control.

Two reception buffers 193 may be provided, one storing packets requiring real-time processing and one storing packets not requiring real-time processing. By employing the technology described above, however, it is ensured that packets requiring real-time processing are received in preference to other packets using only one reception buffer 193. In this way, the hardware scale is prevented from growing and the power consumption is reduced, in comparison with a configuration in which two reception buffers 193 are provided.

Information indicating whether data requiring real-time processing are included may be stored in header information of the packet so that a determination as to whether storage of the packet in the reception buffer 193 is allowed may be made by referring to the information and retrieving the packet type. Threshold levels may be set on the basis of other criteria as well as requirements for real-time processing so that priority for storage in the reception buffer 193 may be determined accordingly. For example, the threshold level for packets of great importance not allowing for loss of data may be set to be lower than that of other packets so that important packets are stored in preference to other packets. The packet determination section 194 may store threshold levels and retrieve a space remaining in the reception buffer 193 from the buffer saturation detecting section 198 so as to determine whether writing in the reception buffer 193 is permitted.

Figure 9:
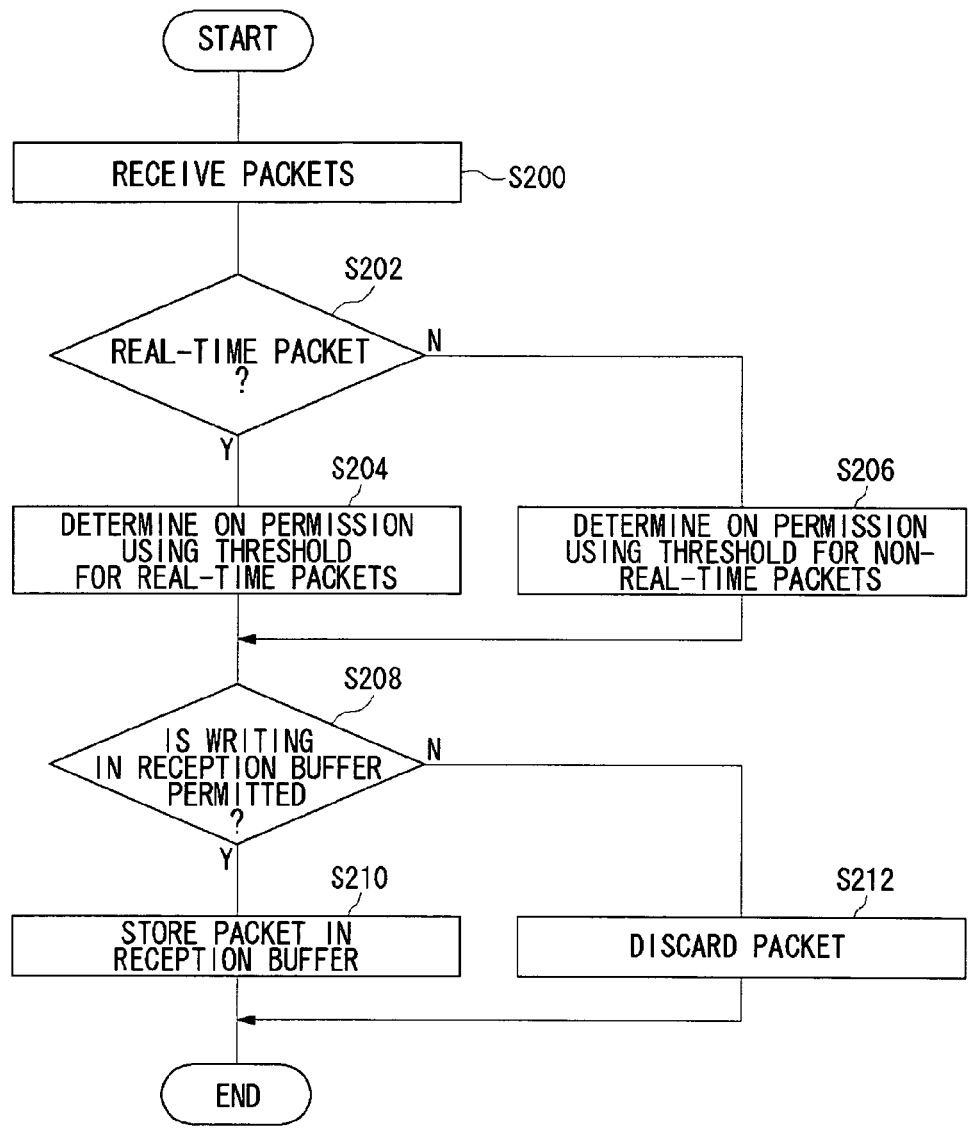
FIG. 9 is a flowchart showing a procedure for receiving packets according to the sixth embodiment.

FIG. 9 is a flowchart showing a procedure for receiving packets according to the sixth embodiment. When the network interface section 130 receives a packet (S200), the packet determination section 194 determines whether the packet includes data that require real-time processing (S202). If it is determined that the packet includes real-time data (Y of S202), a determination on permission of storage in the reception buffer 193 is made using a threshold level set up for the real-time packets (S204). If it is determined that the packet does not include real-time data (N of S202), a determination on permission of storage in the reception buffer 193 is made using a threshold level set up for the non-real-time packets (S206). If storage of the received packet in the reception buffer 193 is permitted (Y of S208), the packet is stored in the reception buffer 193 (S210). If not permitted (N of S208), the packet is discarded (S212).

Figure 10:
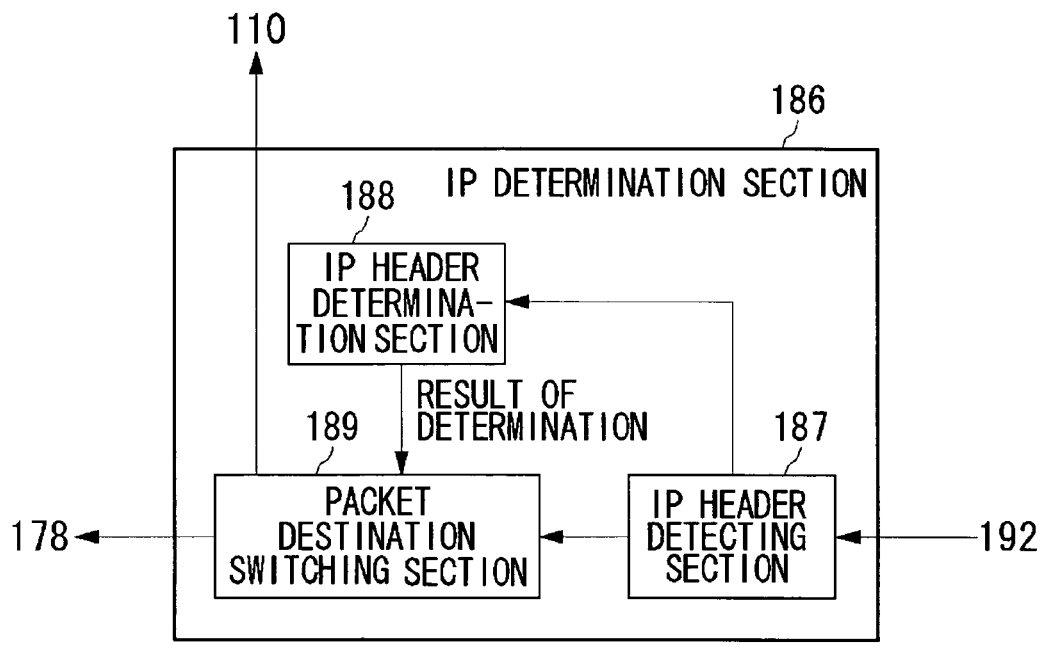
FIG. 10 shows an internal construction of an IP determination section of the Internet phone apparatus according to the sixth embodiment.

FIG. 10 shows an internal construction of the IP determination section 186. The IP determination section 186, an example of a first determination section, includes an IP header detecting section 187, an IP header determination section 188 and a packet destination switching section 189. The IP header detecting section 187 detects an IP header in a packet retrieved from the packet receiving section 192 and sends the header to the IP header determination section 188. The IP header determination section 188 refers to the IP header and the like so as to determine whether the packet is a normal IP packet or a special IP packet requiring complex processing. The IP header determination section 188 notifies the packet destination switching section 189 of a result of determination. A special IP packet may be an IP packet with an option or a fragmented IP packet. The packet destination switching section 189 switches between destinations of the IP packet retrieved by the IP header detecting section 187, on the basis of a result of determination by the IP header determination section 188. The packet destination switching section 189 outputs the normal IP packet to the IP processing section 178, an example of a first dedicated circuit, for hardware processing. The packet destination switching section 189 outputs, via a bus interface, the special IP packet requiring complex processing to the CPU 110, an example of general-purpose circuit, for software processing.

A fragmented IP packet requires more complex processing than a normal IP packet, including management of the order of packets and processes for loss and duplication. An IP packet with an option requires a process associated with the attached option. If these exceptional processes are to be implemented by hardware, the circuit scale, cost and power consumption are increased. By providing hardware capable of processing only normal IP packets, the cost and power consumption are reduced.

The packet processed by the IP processing section 178 is forwarded to the UDP determination section 184, an example of second determination section. The UDP determination section 184 determines whether the received packet is a TCP packet or a UDP packet. The UDP packet is subject to hardware processing by the UDP processing section 174, an example of second dedicated circuit. The TCP packet is subject to software processing executed by the CPU 110, an example of genera-purpose circuit. The UDP determination section 184 is provided with the same functions as the protocol detecting section 176 of the first embodiment. In this embodiment, however, the term UDP determination is used to indicate that it determines a type of communications protocol on a transport layer.

In the Internet phone apparatus 100 according to the sixth embodiment, it is possible to select a packet processing entity promptly and appropriately, by using the IP determination section 186 to detect a type of IP packet. By subjecting normal IP packets including data such as speech audio requiring real-time processing to a high-speed process executed by the IP processing section 178, and by subjecting special IP packets requiring complex processing to software processes using the CPU 110, the circuit scale, cost, power consumption and generated heat are prevented from being increased.

Figure 11:
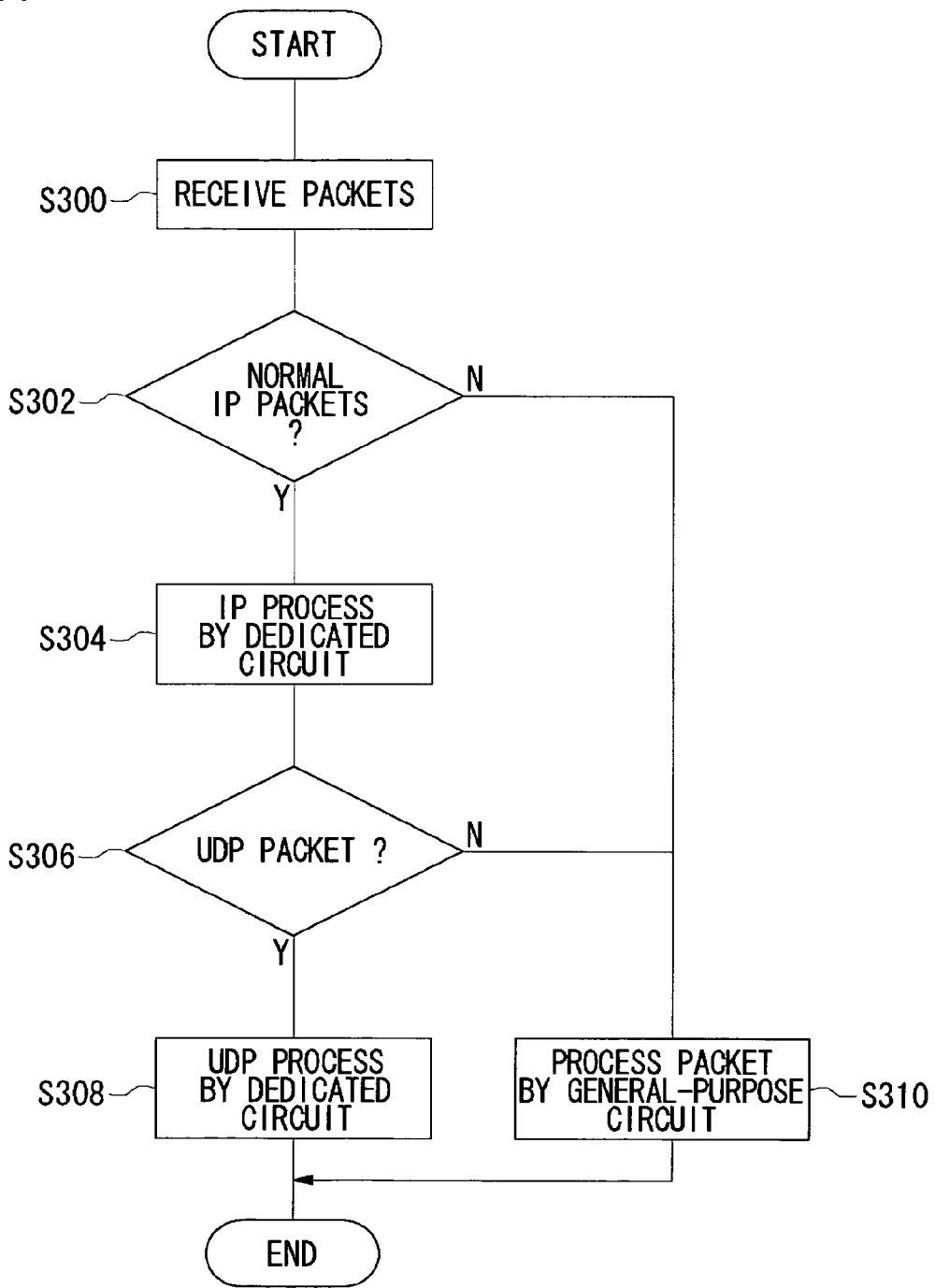
FIG. 11 is a flowchart showing a procedure for processing packets according to the sixth embodiment.

FIG. 11 is a flowchart showing a procedure for processing packets according to the sixth embodiment. When the network interface section 130 receives a packet (S300), the IP determination section 186 determines whether the packet is a normal IP packet (S302). If it is determined that a normal IP packet has arrived (Y of S302), the IP processing section 178, a dedicated circuit, processes the IP packet or not (S304). If it is determined that a special IP packet requiring complex processing such as a fragmented IP packet has arrived (N of S302), the packet is forwarded to the CPU 110, a general-purpose circuit, for software processing (S310). The UDP determination section 184 determines whether the packet processed by the IP processing section 178 is a UDP packet (S306). If it is determined that a UDP packet has arrived (Y of S306), the UDP processing section 174, a dedicated circuit, processes the packet. If it is determined that a TCP packet has arrived (N of S306), the packet is forwarded to the CPU 110, a general-purpose circuit, for software processing (S310).

According to the sixth embodiment, data communication using a plurality of communications protocol is processed efficiently. Moreover, high-speed, real-time communication is achieved using a relatively simple circuit configuration.

Seventh Embodiment

Figure 12:
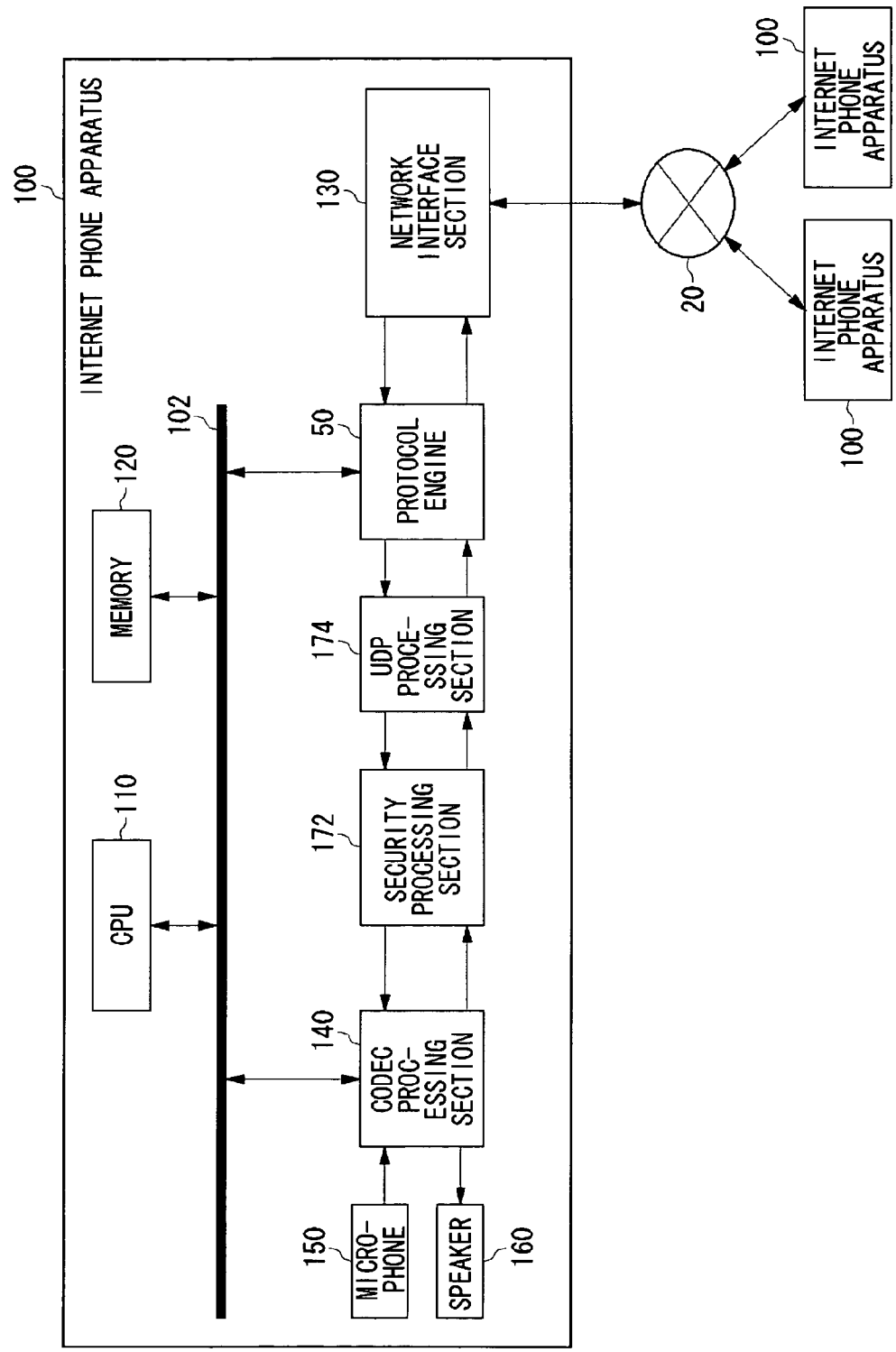
FIG. 12 shows an overall construction of an Internet phone apparatus, an example of communications apparatus according to a seventh embodiment.

FIG. 12 shows an overall construction of an Internet phone apparatus 100, an example of communications apparatus according to a seventh embodiment of the present invention. The Internet phone apparatus 100 is an apparatus for speech communication with the other Internet phone apparatus 100 over the Internet 20. The Internet phone apparatus 100 comprises: a CPU 110, a general-purpose circuit for executing software processes; a memory 120 used as a program area or a work area; a network interface section 130 for transmitting and receiving packets over the Internet 20; a microphone 150 for receiving an audio input; a speaker 160 for outputting an audio signal; a codec processing section 140 for compression coding and decoding of the audio signal; a security processing section 172 for encryption and decryption of communications data; a UDP processing section 174, a circuit dedicated to processing of UDP packets; a protocol engine 50 for executing processes associated with the communications protocol; and a bus 102 for electrically connecting the listed sections.

The Internet phone apparatus 100 according to the seventh embodiment does not depend only on the CPU 110 for processing of received packets. The protocol engine 50 constructed of dedicated hardware executes header analysis, error check, data alignment etc. before transferring packets to the CPU 110. Accordingly, it is not necessary for the CPU 110 to execute unnecessary packet-related processes so that the processing load imposed thereon is significantly reduced.

The Internet phone apparatus 100 according to the seventh embodiment transmits and receives an audio signal using UDP. UDP does not require establishment of connections and is capable of sending out packets continuously. Therefore, protocol-related processes are simplified and high-speed communication is enabled. For this reason, UDP is suitable for real-time communication such as transmission of speech audio. In the Internet phone apparatus 100 according to the seventh embodiment, the UDP processing section 174 is dedicated to the task of processing UDP packets. In this way, the processing speed is further improved so that real-time transmission and reception of speech audio is enabled.

TCP packets transmitted and received by the Internet phone apparatus 100 are subject to software processes that use the CPU 110. For TCP packets that do not require real-time response, no dedicated circuit is provided and only software processes are executed by a general-purpose circuit. In this way, the circuit scale is prevented from being increased, and an increase in the cost, power consumption and generated heat is minimized. According to an estimate made by the inventors of the present invention, the circuit area and power consumption are reduced to approximately ⅓ of that of a configuration in which both TCP and UDP are processed by dedicated circuits. Thus, according to the seventh embodiment, by allowing the dedicated hardware and genera-purpose software to operate in cooperation with each other, contradictory requirements including high-speed processing and reduction in circuit scale are fulfilled.

Packets received by the network interface section 130 are sent to the protocol engine 50. The protocol engine 50 determines whether the packet is destined to an IP address assigned to the host it belongs to. The protocol engine 50 forwards only legitimate packets and discards the other packets. If it is determined that the packet is a TCP packet by referring to the header information attached to the packet, the protocol engine 50 forwards the packet data to the bus 102 for software processing by the CPU 110. If the packet is a UDP packet, the protocol engine 50 forwards the packet data to the UDP processing section 174 for processing by a circuit dedicated to processing of UDP packets.

The UDP processing section 174 is a circuit dedicated to processing of UDP packets. More specifically, the UDP processing section 174 receives UDP packets, analyzes the header and executes necessary processes. A security processing section 172 executes processes such as decoding of encrypted data when security measures such as encryption are introduced in the data. The decoded data are forwarded to the codec processing section 140. The codec processing section decodes compression coded data to retrieve a speech audio signal and outputs the signal to the speaker 160.

As described above, according to the Internet phone apparatus 100 of the first embodiment, speech audio data requiring real-time response rather than-accuracy and continuous processing during a speech communication session are transmitted and received using UDP. The UDP processing section 174, a dedicated circuit, is responsible for hardware processes. Data that require accuracy rather than real-time response are transmitted using TCP and subject to software processes using the CPU 110. With this, it is possible to reduce the complexity of circuit, circuit scale, cost, power consumption and generated heat, while improving the speed to process the speech audio data. These advantages will be more easily appreciated when processing a large amount of data simultaneously, i.e., when communicating with a plurality of parties, or when images are transmitted and received in addition to speech audio. By using the protocol engine 50 to detect a packet type, it is possible to select a packet processing entity promptly and appropriately. The processing load imposed on the CPU 110 is reduced so that the cost and power consumption are reduced. As the resources of the CPU 110 may be turned to other uses, it is possible to execute other applications so that new services may be provided.

Described above is an operation executed when packets are received. A description will now be given of an operation executed when an audio signal input via the microphone 150 is packetized for transmission. The audio signal input via the microphone 150 is forwarded to the codec processing section 140 for encoding. The encoded signal is encrypted as required by the security processing section 172 and then forwarded to the UDP processing section 174, where the signal is packetized and a UDP header is attached. The protocol engine 50 attaches header information such as a checksum to the UDP packet, which is then sent to the Internet 20 via the network interface section 130.

Figure 13:
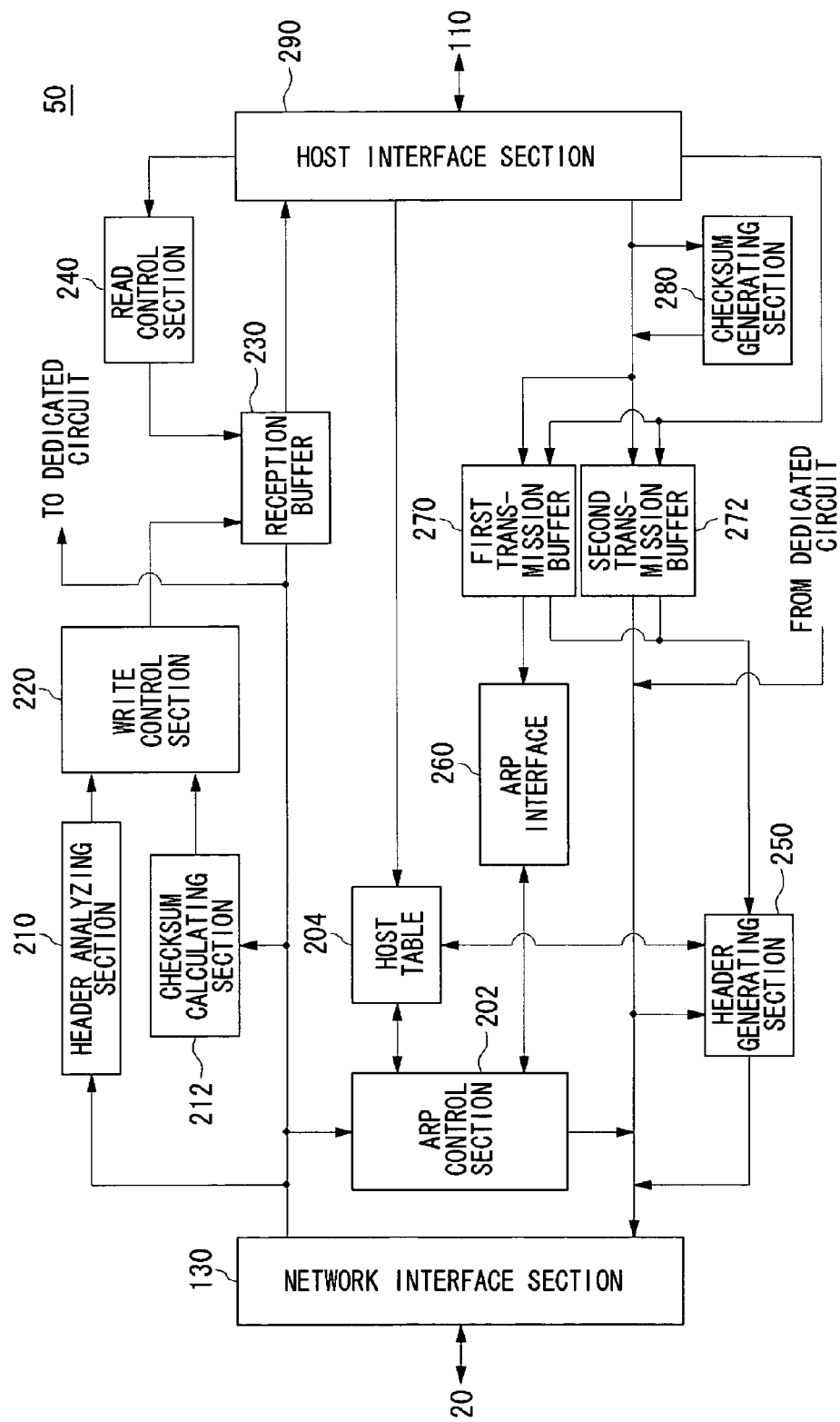
FIG. 13 shows an internal construction of a protocol engine according to the seventh embodiment.

FIG. 13 shows an internal construction of the protocol engine 50. When the network interface section 130 receives an address resolution protocol (ARP) packet destined to an IP address of a host to which it belongs to, an ARP control section 202 automatically creates a response packet by setting address (MAC address) information in a datalink layer. The ARP control section 202 transmits the response packet to a source of transmission of the ARP packet. In the related art, ARP packets are subject to software processing using the CPU 110. By allowing the ARP control section 202 to automatically make a response without depending on the CPU 110, the load imposed on the CPU 110 is significantly reduced and the frequency of task switches derived from interruption is reduced.

A header analyzing section 210 analyzes packet header information, discards unnecessary packets and transmits only necessary packets. For example, the header analyzing section 210 transmits only those packets destined to an IP address of a host to which it belongs to and discards packets destined to the other IP addresses. When installing the protocol engine 50 according to the seventh embodiment in an apparatus for transmission and reception of only IP packets, packets using a communications protocol other than IP may be discarded. Alternatively, packets of a specific type may be detected and forwarded to a circuit dedicated to processing of packets of that type. In the seventh embodiment, UDP packets are processed by the UDP processing section 174, a dedicated circuit. Therefore, when the header analyzing section 210 detects a UDP packet by analyzing the header information, the header analyzing section 210 directly transfers the UDP packet to the UDP processing section 174, bypassing the CPU 110. In this process, the header information may be discarded so that only data portion may be transferred. With this, the CPU 110 is tasked with processing only those packets requiring software processing. Accordingly, the processing load imposed on the CPU 110 is reduced. By processing packets using dedicated hardware as required, the processing speed is increased.

A checksum calculating section 212 calculates a checksum of the packet and examines whether the calculated checksum matches the checksum stored in the header. If they match, the packet is transmitted. If not, the packet is discarded. In the related art, the CPU 110 is responsible for checksum validation. By allowing a dedicated circuit to validate a checksum before transmitting the packet to the CPU 110 as in this embodiment, the CPU 110 is prevented from executing unnecessary packet-related processes so that the processing load imposed thereon is reduced.

A write control section 220 stores the packet past the header analyzing section 210 in the reception buffer 230. The packet in which an error is detected by the checksum calculating section 212 is discarded without being stored in the reception buffer 230. It is more efficient for the reception buffer 230 to continue to accept packets for storage therein, while the checksum calculating section 212 calculates a checksum, rather than letting the reception buffer 230 wait for completion of checksum calculation before storage of a packet. For this reason, the write control section 220 writes packets past the header analyzing section 210 in the reception buffer 230 without waiting for a result of validation by the checksum calculating section 212. When the validation by the checksum calculating section 212 reveals an error, the written packet is deleted and returns a write pointer to its original location. A read control section 240 controls reading of received packets stored in the reception buffer 230. Details of the construction and operation of the write control section 220, the reception buffer 230 and the read control section 240 will be described with reference to FIG. 15.

A checksum generating section 280 calculates a checksum of packets to be transmitted. The packet size of a UDP packet is established when the UDP packet is introduced into a transmission queue. The checksum generating section 280 calculates a checksum of a data portion and holds the calculated checksum. A header generating section 250 sets the checksum in the header when the packet is ready for transmission. The packet size of a TCP packet is established when the packet is transmitted. Therefore, it is not possible to calculate a checksum of a data portion previously. By calculating accumulated checksums at predetermined intervals in the packet and holding the accumulated checksums, the checksum calculation process performed when the packet is ready for transmission is simplified. By limiting the size of TCP packet to an integral multiple of an interval for calculation of accumulated checksum, the checksum of a data portion is obtained by subtracting the accumulated checksum preceding the interval for target data portion from the accumulated checksum at the interval at the end of the target data portion.

A first transmission buffer 270 stores packets to be transmitted for which destination MAC addresses are not resolved yet. A second transmission buffer 272 stores packets to be transmitted for which destination MAC addresses are known. An ARP interface 260 generates ARP packets for broadcasting over the network in order to resolve MAC addresses for packets which are stored in the first transmission buffer 270 and for which destination MAC addresses are not known. The unresolved packets cannot be transmitted until the ARP packets are responded. This is why the first transmission buffer 270 is provided aside from a queue for packets for which address resolution is not necessary. While the first transmission buffer 270 stands by for acknowledgement of the ARP packets, the second transmission buffer 272 transmits packets for which address resolution is not necessary. When the ARP packets are responded, the resolved MAC addresses are set in the packets stored in the first transmission buffer 270. The packets are then transmitted from the first transmission buffer 270. ARP packets are then transmitted for subsequent packets standing by. The packets in the second transmission buffer 272 are transmitted until the ARP packets are responded. With this, the overall waiting time for transmission is reduced so that packets are transmitted efficiently. By introducing packets for which MAC addresses are not resolved into the first transmission buffer 270, MAC address resolution is automatically performed and the packets are automatically transmitted. Therefore, processes executed by the CPU 110 is simplified so that the processing load imposed thereon is reduced.

In order to transmit standby packets stored in the first transmission buffer 270 or the second transmission buffer 272 via the network interface section 130, a header generating section 250 generates header information for the packets. The header generating section 250 generates header information by automatically generating parameters not frequently altered and parameters easily estimated. For example, an identifier of the IP header need not be specified by the CPU 110 but may be set in the header by automatic increments using the header generating section 250. Other than the data itself, the CPU 110 needs only to specify a destination and packet size. With this, buffer management of the CPU 110 is simplified and the processing load is reduced.

Figure 14:
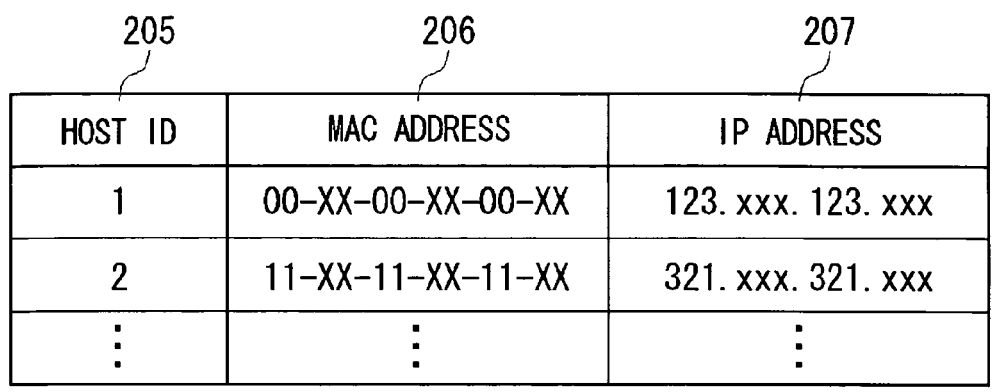
FIG. 14 shows data in a host table according to the seventh embodiment.

A host table 204 stores MAC addresses and IP addresses of other hosts mapped into each other. FIG. 14 shows an example of data in the host table 204. The host table 204 is provided with a host ID column 205, a MAC address column 206 and an IP address column 207. The host table 204 may store information related to hosts likely to be communicating with the CPU 110 frequently. Alternatively, the CPU 110 may register information in the host table 204 during communication. For hosts for which MAC addresses are not known, only IP addresses may be stored. MAC addresses may be registered when responses to ARP packets transmitted by the ARP interface 260 are collected. With the provision of the host table 240, the CPU 110 may use any of a host ID, a MAC address or an IP address to specify a destination of packet. The header generating section 250 refers to the host table 204 so as to retrieve information necessary to generate a header.

A host interface section 290 controls input and output of data and instructions between the elements constituting the protocol engine 50 and the CPU 110.

Figure 15:
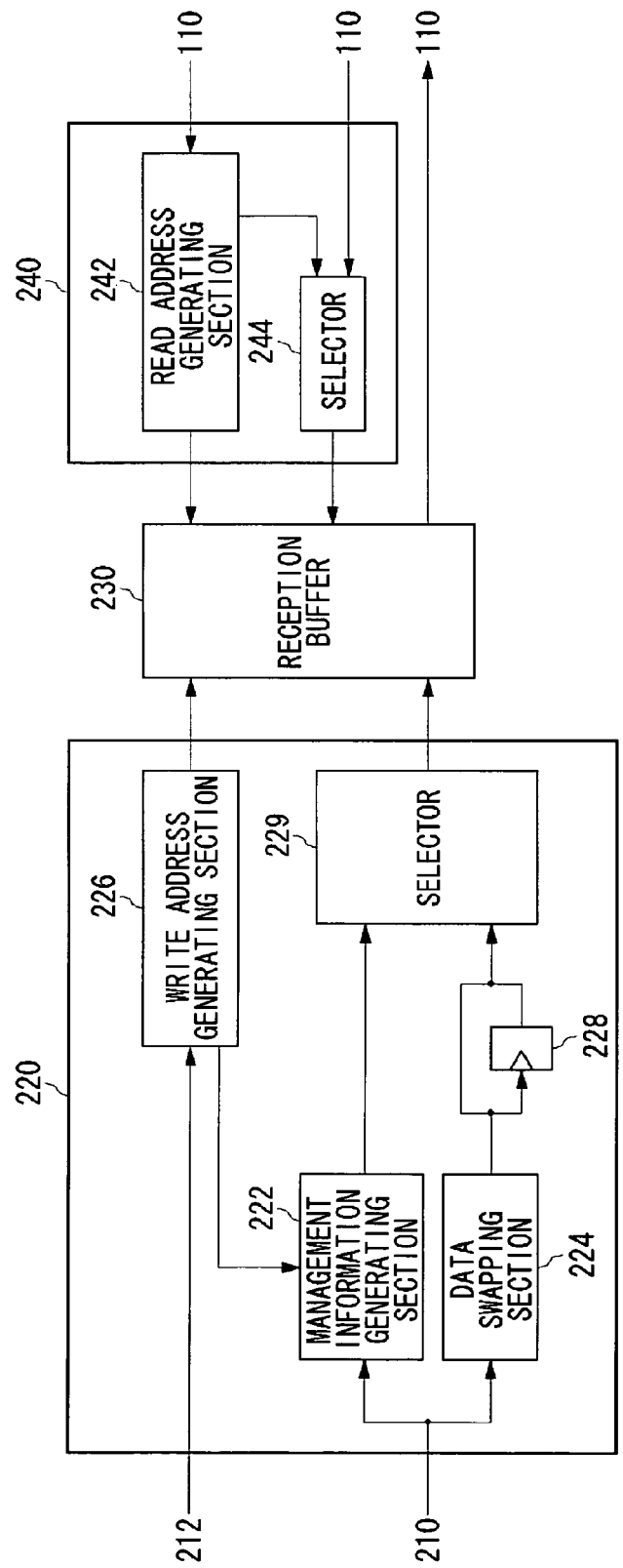
FIG. 15 shows an internal construction of a write control section and a read control section according to the seventh embodiment.

FIG. 15 shows an internal construction of the write control section 220 and the read control section 240. The write control section is provided with a management information generating section 222, a data swapping section 224, a write address generating section 226, a delay circuit 228 and a selector 229. The packet that passed packet filtering by the header analyzing section 210 is shaped by the management information generating section 222 and the data swapping section 224 and stored in the reception buffer 230. Shaping of the packet will be described later with reference to FIG. 16. The write address generating section 226 manages a write pointer of the reception buffer 230. As described earlier, packet data are stored in the reception buffer 230 in concurrence with checksum validation by the checksum calculating section 212. When an checksum error is detected, the write address generating section 226 returns the write pointer to its original location. When checksum errors are not found and storage in the reception buffer 230 is completed normally, the write address generating section 226 notifies the management information generating section 222 of the address of packet that follows. The read address control section 240 is provided with a read address generating section 242 and a selector 244.

Figure 16:
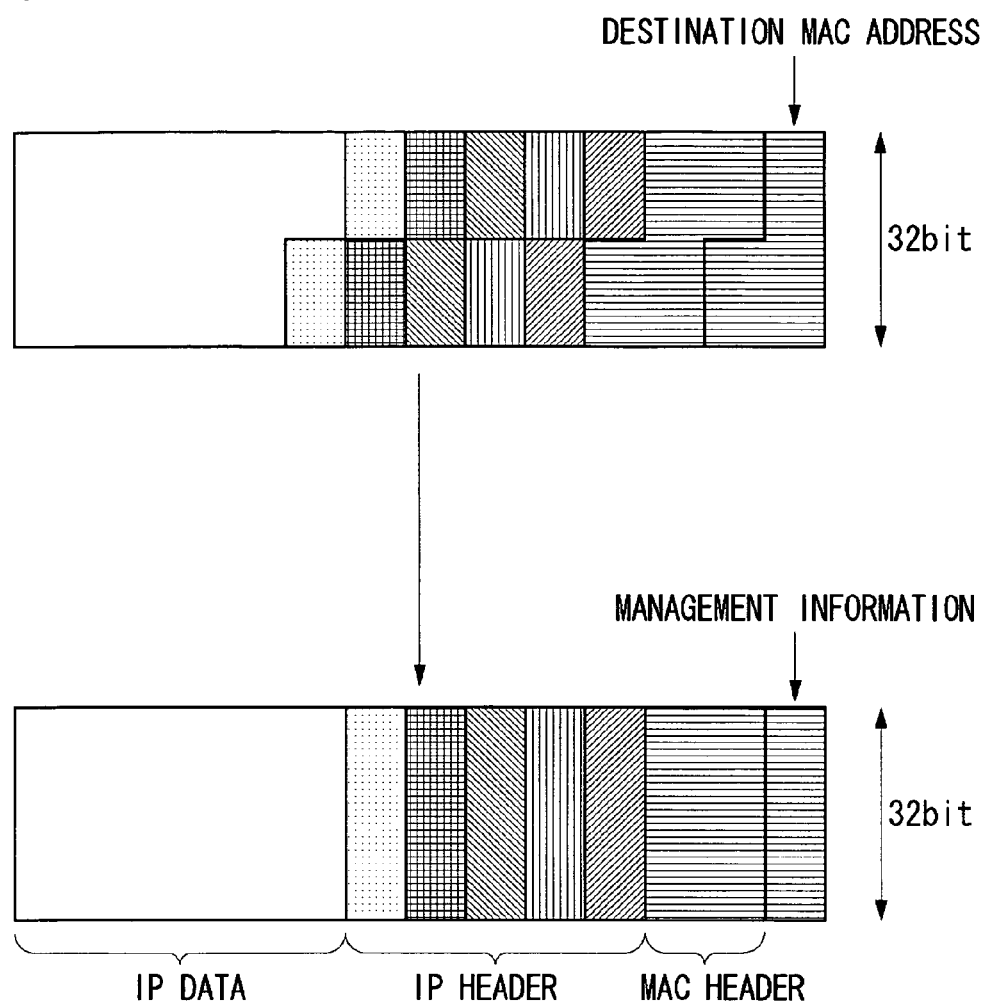
FIG. 16 shows how packet data are shaped by a write control section.

FIG. 16 shows how packet data are shaped by the write control section 220. In an ordinary IP packet, the MAC header at the head occupies 14 bytes, which corresponds to 3.5 word in a 32-bit word configuration. This forces misalignment as long as 16 bits in subsequent data with respect to the word configuration. Storing unshaped packet in the reception buffer 230 results in inconvenience when accessing the buffer. In this embodiment, data are shaped so that the MAC header occupies 3 words before storing the data in the reception buffer 230. In other words, 16 bits are curtailed from the MAC header. The destination MAC address of the MAC header is the same as the MAC address of the host hosting the reception buffer 230. Since the packet is already received, the destination MAC address is not necessary. Since the MAC address occupies 48 bits, discarding the destination MAC address creates a margin of 32 bits. Some applications demand information relating to type of transmission, i.e. unicast, multicast or broadcast. Identification of transmission type may be stored as a flag in place of the destination MAC address. Since the flag occupies only 2 bits, there still remains 30 bits for use. A flag indicating packet type or address information indicating the location at which the following packet is stored are stored as management information. With the above-described approach, the MAC header is fitted to a 3-word space so that subsequent data are aligned with the word configuration, resulting in ease of access.

Referring back to FIG. 15, a description will be given of how received packets are written and read out. The management information generating section 222 generates management information described above. The management information generating section 222 may generate, as management information, transmission type information indicating whether the packet is transmitted using unicast, multicast or broadcast, packet type information indicating whether the packet is a TCP packet or a UDP packet, or whether the packet is a special IP packet requiring complex processing such as a fragmented IP packet or an IP packet with an option, and address information indicating the location at which the following packet is stored. Only after storage of given data packet is completed, address information of the following packet is retrieved from the write address generating section 226. Therefore, writing of the management information, including the address information indicating the location of storage of the next packet, in the reception buffer 230 may occur only after the given packet data has been stored. The management information is shaped to have a 1-word overall length and stored in the reception buffer 230 via the selector 229.

The data swapping section 224 swaps the upper 16 bits with the lower 16 bits in order to align received packet data, with the MAC address removed, with the 32-bit word configuration. The upper 16 bits output from the data swapping section 224 are delayed by one clock by the delay circuit 228. In this way, data with 16-bit misalignment are fully aligned. The shaped data are stored in the reception buffer 230 via the selector 229.

The write address generating section 226 moves the pointer to the head of write position. The pointer is incremented initially because the management information, the first one word, is stored last. The MAC header of 2 words, with the MAC address removed, the IP header of 5 words and the IP data are written successively, as the pointer is incremented. When the data portion has been written, the subsequent write start position is reported to the management information generating section 222. The pointer is returned to the head of the write position so that the management information is written.

The header information including the management information is assigned an independent register so that the CPU 110 may make random access to the information as many times as required. The packet-stored in the reception buffer 230 has been already validated by the header analyzing section 210 and the checksum calculating section 212. The CPU 110 is allowed to access the header information directly so as to determine an application to which the data should be destined. The data portion, on the other hand, is read out from a single access port register. In an initial step of reading from the access port register, data at the head of the data portion are read out. Subsequently, data are read out successively by continuing to access the same register. Once the destination of data is determined, the remaining task is to copy data. Therefore, it is not necessary to enable random access. By employing the access port method, the processing load is reduced as compared to the memory map method in which pointer management is necessary. Another advantage is that the access port approach may be used in combination with hardware without the CPU 110.

The read address of the reception buffer consists of the upper address and the lower address. The CPU 110 specifies both the upper address and the lower address when accessing the header information of packet stored in the reception buffer 230. The CPU 110 specifies a packet and a header that need to be accessed to the read address generating section 242. The read address generating section 242 automatically generates the upper address and moves the pointer accordingly. The lower address output by the CPU 110 is used as the lower address in the reception buffer. The CPU 110 is given free access to the lower address. When accessing the data portion of packet, the CPU 110 specifies, to the read address generating section 242, the packet data to be accessed. The read address generating section 242 automatically generates the upper address and lower address, moving the pointer accordingly so that data are read out successively.

In this embodiment, a description was given using a telephone apparatus as an example. The technology of the seventh embodiment is also applicable to communication equipment in general that transmits and receives stream data, such as a computer and a portable phone.

Circuits having the functions of the protocol engine 50 may be built on a single semiconductor substrate. Further, the security processing section 172, the codec processing section 140 and the CPU 110 may be built in the circuits. With this, miniaturization, light-weight and high-speed processing of the communication apparatus are achieved.

According to the seventh embodiment, it is possible to provide a technology capable of efficiently processing packets for data communication. According to the seventh embodiment it is also possible to provide a technology capable of reducing the processing load imposed on the CPU in processing packets and realizing high-speed, real-time communication.

Eighth Embodiment

Figure 17:
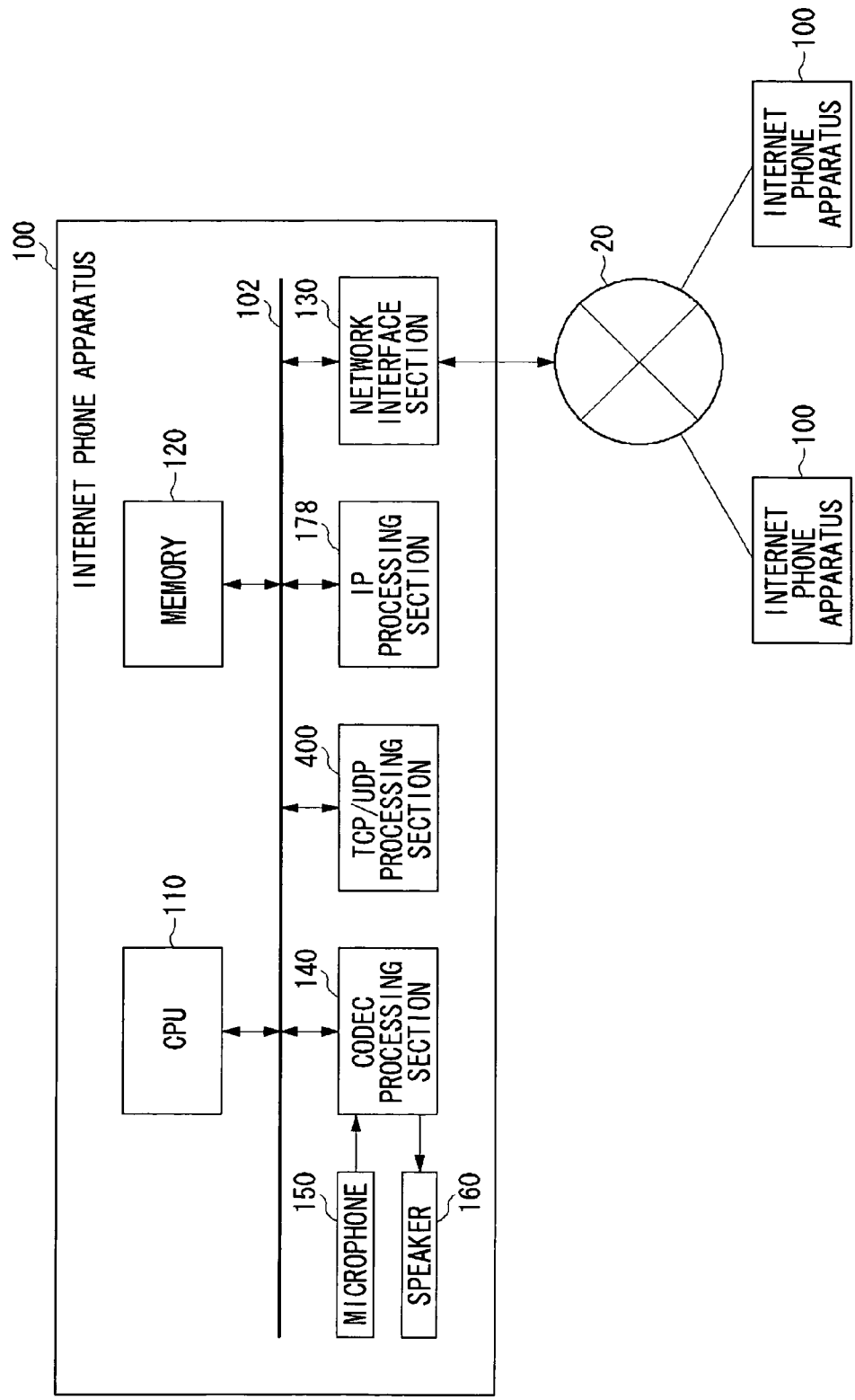
FIG. 17 shows an overall construction of an Internet phone apparatus, an example of communications apparatus according to an eighth embodiment.

FIG. 17 shows an overall construction of an Internet phone apparatus 100, an example of communications apparatus according to an eighth embodiment of the present invention. The Internet phone apparatus 100 is an apparatus for conducting speech communication with the other Internet phone apparatus 100 over the Internet 20. The Internet phone apparatus 100 comprises: a CPU 110, a general-purpose circuit for executing software processes; a memory 120 used as a program area or a work area; a network interface section 130 for transmitting and receiving packets over the Internet 20; a microphone 150 for receiving an audio input; a speaker 160 for outputting an audio signal; a codec processing section 140 for compression coding and decoding of the audio signal; an IP processing section 178 for executing processes for communication using IP; a TCP/UDP processing section 400 executing processes for communication using TCP or UDP; and a bus 102 for electrically connecting the listed sections.

For transmission of data such as an audio signal and the like using TCP/IP, the Internet phone apparatus 100 according to the eighth embodiment generates TCP packets such that accumulated checksums are calculated at predetermined intervals when data for transmission are fed. When the size of TCP packet is determined, the checksum of the packet is calculated using the accumulated checksums. With -this, in comparison with a related-art method in which a checksum is calculated after the size for transmission is determined and the data are read out, time required for checksum calculation is significantly reduced. A further detailed description on this will be given with reference to FIG. 18 and subsequent figures.

A general description will be given of an operation executed when the Internet phone apparatus 100 receives packets. Packets received by the network interface section 130 are sent to an IP processing section 178. The IP processing section 178 determines whether the packet is destined to an IP address assigned to the host it belongs to. The IP processing section 178 forwards only legitimate packets to the TCP/UDP processing section 400. The TCP/UDP processing section 400 refers to the header information and the like to determine whether the packet is a TCP packet or a UDP packet, and subjects the packet to necessary processes. If the received packet is an audio signal, the data are forwarded to the codec processing section 140. The codec processing section decodes compression coded data to retrieve a speech audio signal and outputs the signal to the speaker 160.

A general description will be given of an operation of the Internet phone apparatus 100 for transmitting data including an audio signal. The audio signal input via the microphone 150 is forwarded to the codec processing section 140 for encoding. The encoded signal is encrypted as required by a security processing section (not shown) and then forwarded to the TCP/UDP processing section 400. The TCP or UDP packet thus generated is sent to the Internet 20 via the network interface section 130.

The functions of the IP processing section 178, the TCP/UDP processing section 400 and the codec processing section 140 are implemented by hardware such as the CPU 110 and the memory 120 and by software such as programs adapted for protocol processing functions and codec processing functions. FIG. 17 illustrates functional blocks implemented by cooperation of hardware and software. These functional blocks may be implemented in a variety of manners using combinations of hardware and software. Alternatively, the illustrated construction may be implemented by dedicated circuits. FIG. 17 shows the IP processing section 178, the TCP/UDP processing section 400 and the codec processing section 140 being connected to the bus 102. When these sections are implemented by dedicated circuits, the circuits may be connected to each other by dedicated buses.

Figure 18:
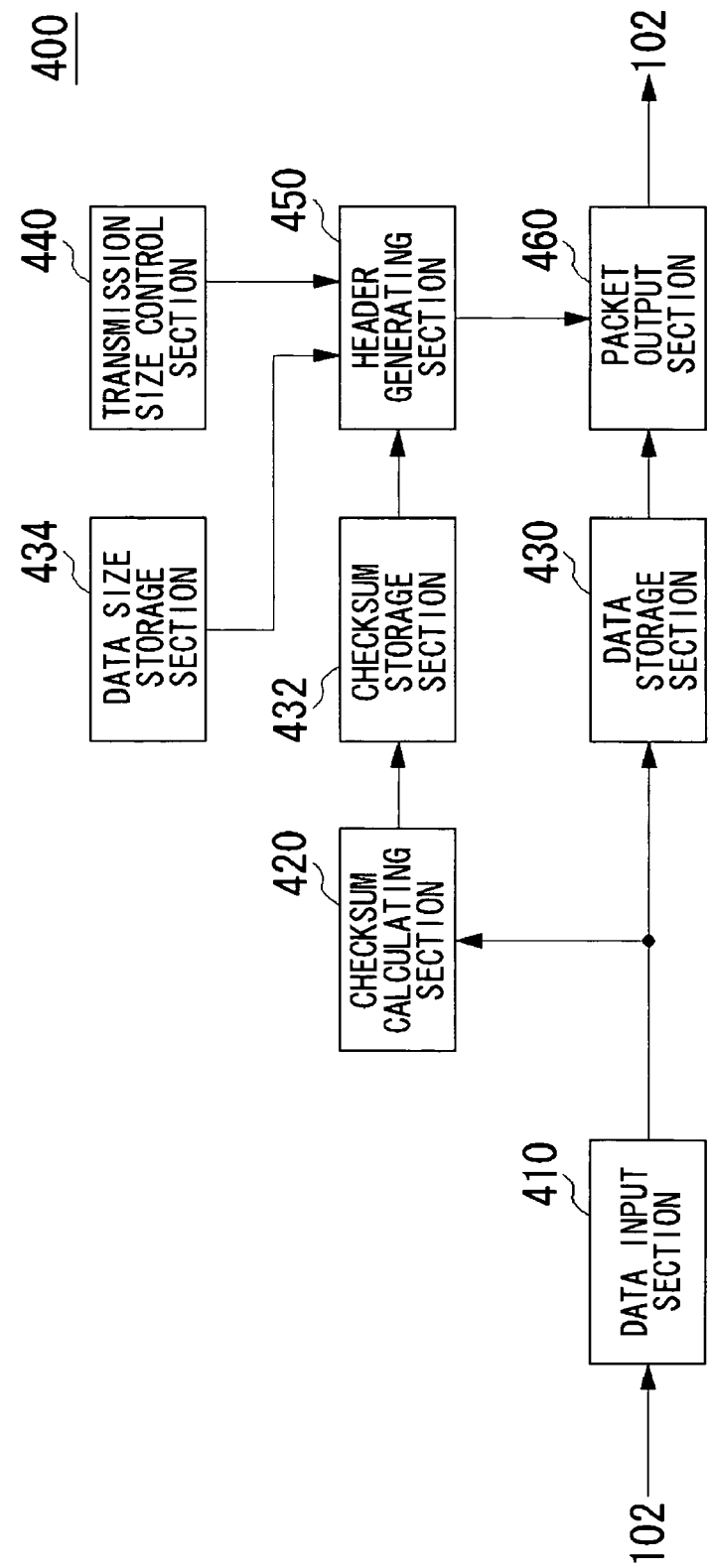
FIG. 18 shows an internal construction of a TCP/UDP processing section of FIG. 17.

FIG. 18 shows an internal construction of the TCP/UDP processing section 400 related to the implementation of packet generating function characteristic to the eighth embodiment. The TCP/UDP processing section 400 includes: a data input section 410 for receiving input of transmission data prepared by the CPU 110 and the like; a checksum calculating section 420 for calculating accumulated checksums of transmission data; a data storage section 430 for storing the transmission data, a checksum storage section 432 for storing accumulated checksums at predetermined intervals of the transmission data; a data size storage section 434 for storing the size of data that remain in the data storage section 430 untransmitted; a transmission size control section 440 for controlling the size of TCP packet transmitted; a header generating section 450, an example of second calculating section, for generating header information of TCP and UDP packets; and a packet output section 460 for outputting TCP and UDP packets.

A description will be given of a procedure for generating TCP packets. The transmission data fed by the CPU 110 and the like via the data input section 410 are stored in the data storage section 430 and sent to the checksum calculating section 420. The checksum calculating section 420 calculates accumulated checksums of the input data from head to end, outputs the calculated accumulated values for predetermined intervals and stores the same in the checksum storage section 432. A checksum is calculated by sequential one's complement addition of data in units of 16 bits (1 word). If a result of addition does not fit in the 16-bit configuration and an overflow occurs, 1 is added to the result of addition.

Figure 19:
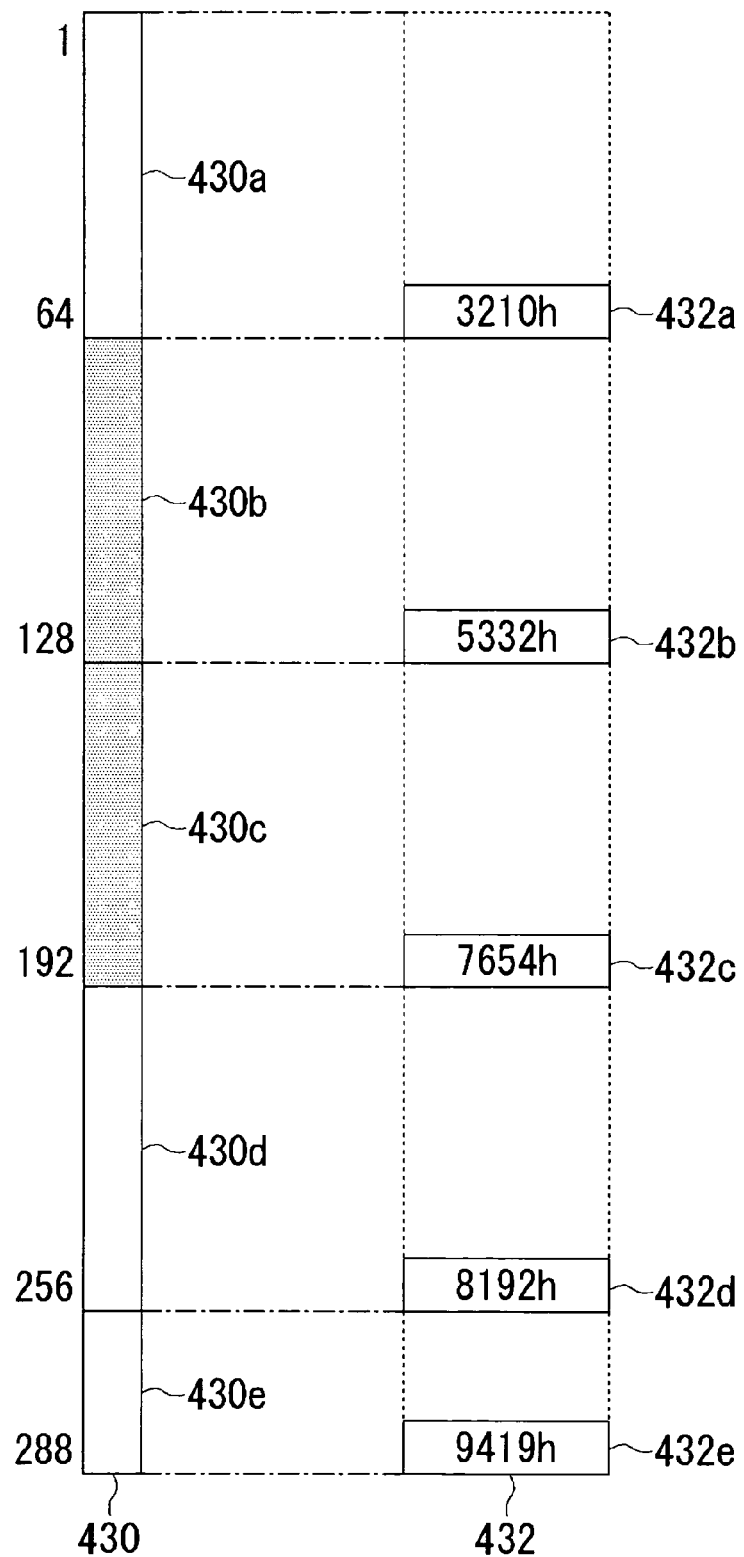
FIG. 19 shows an example of internal data in a data storage section and a checksum storage section.

FIG. 19 shows an example of internal data in the data storage section 430 and the checksum storage section 432. In the illustration, transmission data of 288 words are stored in the data storage section 430. The checksum storage section 432 stores accumulated checksums at 64-bit intervals. For example, the checksum accumulated from the head of the transmission data through the 64th word is 3210 hexadecimal and the checksum accumulated through the 128th word is 5332 hexadecimal.

Referring back to FIG. 18, the procedure for generating TCP packets will be described. The transmission size control section 440 determines the size of TCP packet to be subsequently transmitted, in consideration of the condition of reception buffer and the network condition related to packet loss etc. The size of TCP packet is limited to an integral multiple of a unit length of intervals in which accumulated checksums are recorded. In other words, the size of TCP packet is limited to an integral multiple of 64 words according to the eighth embodiment. The reason for this will be discussed later.

The header generating section 450 retrieves the size of TCP packet to be subsequently transmitted from the transmission size control section 440 and determines data intervals to be transmitted, on the basis of the retrieved size. The header generating section 450 reads the checksum accumulated through the interval immediately preceding the determined intervals and the checksum accumulated through the last of the determined intervals. The header generating section 450 then calculates a difference between the checksums thus read so as to obtain a checksum for the determined intervals. In one's complement arithmetic, a negative number is indicated by bit inversion of an absolute value. Subtraction is performed such that a−b=a⊕̂b, where ⊕̂ indicates bit inversion of b. The header generating section 450 stores the checksum in the header information and outputs the header information. The packet output section 460 outputs the header information retrieved from the header generating section 450, subsequently reads data of a size to be transmitted from the data storage section 430 and outputs the same.

In the example of FIG. 19, given that the TCP packet to be initially transmitted is 64 words, the checksum of the packet is 3210h. It is assumed that transmission of packet having a data size of 144 words is possible subsequently. The transmission size control section 440 determines the size of subsequently transmitted TCP packet such that the size is an integral multiple of a unit length of intervals in which accumulated checksums are recorded and does not exceed the transmittable packet size. In this case, the size would be 128 words, a maximum multiple of 64 not exceeding 144. The checksum for data inclusive of 430b and 430c to be transmitted is determined by subtracting the checksum 3210h accumulated through the interval immediately preceding the intervals inclusive of 430b and 430c, from the checksum 7654h accumulated through the last of the intervals inclusive of 430b and 430c. In other words, the checksum is 4444h.

When the data are transmitted, the size of data transmitted is subtracted from the size of untransmitted data stored in the untransmitted data size registered in the data size storage section 434. If the data size of TCP packet determined by the transmission size control section 440 is larger than the size of untransmitted data, the data size registered in the data size storage section 434 is output to the header generating section 450. In this case, the header generating section 450 subtracts the accumulated checksum for the data interval transmitted immediately before, from the accumulated checksum for the data as a whole, so as to obtain a checksum for the data for to be transmitted.

By storing accumulated checksums at predetermined intervals and calculating a checksum for a packet using the accumulated values, time required for calculation of checksum is significantly reduced. Accordingly, a delay time that elapses since determination of a packet size until transmission of the packet is reduced. This is particularly effective when transmitting and receiving data such as speech audio requiring real-time processing.

The size of a unit interval in which an accumulated checksum is recorded may be designed in consideration of the performance of the transmitting end, the receiving end and the network. Communication over the network inevitably involves some degree of uncertainty. Moreover, communication using packets of an unnecessarily small size is inefficient. Therefore, no problems are presented by limiting the size of transmitted packet to an integral multiple of 64 words. By storing accumulated checksums at every 64 word, the capacity of the checksum storage section 432 is ¹⁄₆₄ of that of a case in which accumulated checksums are registered for the entirety of data. The data read from the memory for calculation of a checksum for a packet are limited to 2 words corresponding to accumulated checksums preceding and succeeding the packet data. Therefore, the data storage section 430 and the checksum storage section 432 may not be implemented as two separate memories but may be integrated as one. This means that no serious constraints are imposed on the configuration of memories.

The method described above may be implemented by software. Alternatively, by applying this method to a configuration where processes related to TCP and UDP are executed by dedicated hardware for increased speed, overhead in memory access is improved and the processing speed is increased more efficiently.

A description will be given of a procedure for generating UDP packets. The data fed by the CPU 110 via the data input section 410 are stored in the data storage section 430 and sent to the checksum calculating section 420. In the case of UDP, the size of packet to be transmitted is specified prior to transmission. Therefore, it is not necessary to store accumulated checksums at predetermined intervals. The checksum for the packet as a whole is calculated and stored in the checksum storage section 432. The header generating section 450 reads the checksum of UDP packet to be subsequently transmitted from the checksum storage section 432, stores the same in the header information and outputs the header information including the checksum. The packet output section 460 outputs the header information retrieved from the header generating section 450, reads the data from the data storage section 430 and outputs the same.

Thus, according to the eighth embodiment, configurations for generating TCP and UDP packets need not be provided separately. Packets of both types are generated and transmitted using the same configuration.

When the size of packet to be initially transmitted is larger than the data size in TCP data transmission, it is possible to transmit the entirety of data in one session. Therefore, there is no need to calculate checksums by subtraction. The checksum of the entire data is the checksum of the packet.

Figure 20:
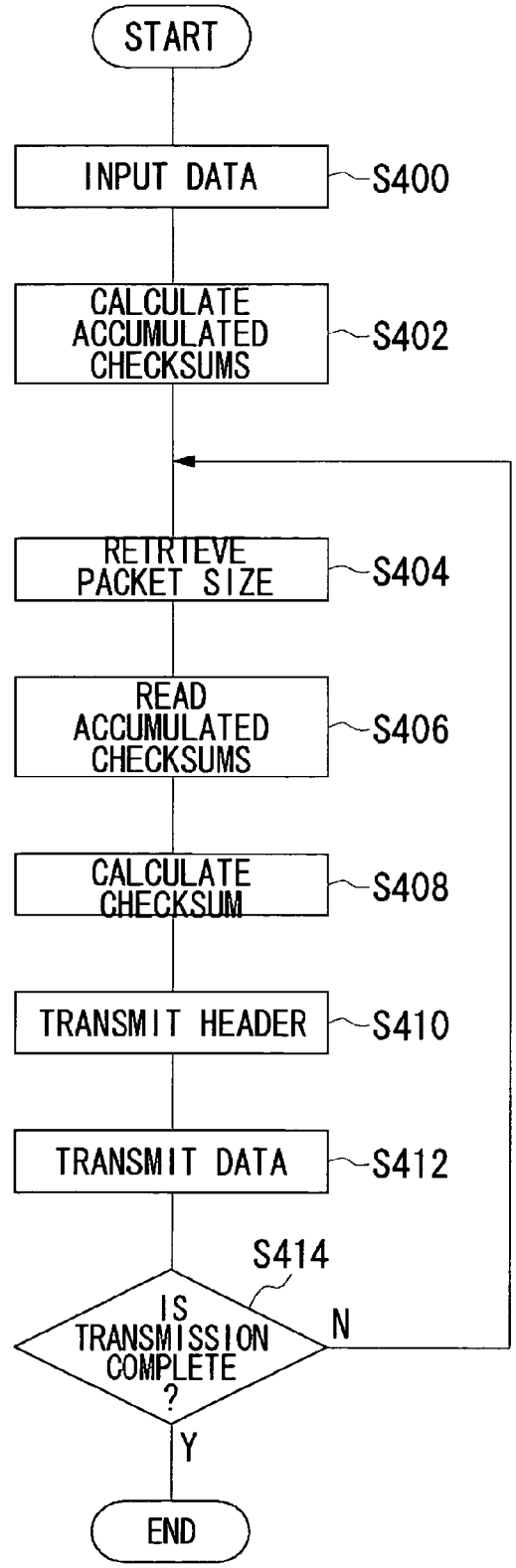
FIG. 20 is a flowchart showing a procedure for calculating checksums according to the eighth embodiment.

FIG. 20 is a flowchart showing a procedure for calculating checksums according to the eighth embodiment. When data to be transmitted are fed by the CPU 110 via the data input section 410 (S400), the checksum calculating section 420 calculates accumulated checksums of the input data from head to end. The accumulated checksums are output at predetermined intervals and stored in the checksum storage section 432 (S402). The header generating section 450 retrieves the size of TCP packet to be subsequently transmitted from the transmission size control section 440 (S404) and determines intervals in data to be transmitted, on the basis of the retrieved size. The header generating section 450 reads, from the checksum storage section 432, the checksum accumulated through the interval immediately preceding the determined intervals, and the checksum accumulated through the last of the determined intervals (S406). The header generating section 450 calculates a difference between the checksums thus read so as to obtain the checksum for the determined intervals (S408). The packet output section 460 transmits the header information including the checksum retrieved from the header generating section 450 (S410), reads the data of the transmission size from the data storage section 430 and transmits the read data (S412). When data remain to be transmitted (N of S414), control is returned to S404, whereupon the procedure for generating and transmitting packets is repeated. When the entirety of data have been transmitted (Y of S414), the whole process is terminated.

In this embodiment, a description was given using an Internet phone apparatus as an example. The technology of the eighth embodiment is also applicable to communication equipment in general that transmits and receives data, such as a computer, a portable phone, a digital camera and video equipment. The technology of embedding accumulated checksums for a sequence of data calculated from head to end at a plurality of locations is applicable not only to communication but also to equipment for recording data in general.

Circuits having the capabilities of the TCP/UDP processing section 400 and memories may be built on a single semiconductor substrate. Further, the IP processing section 178, the codec processing section 140, the CPU 110 and the security processing section may be built in the circuits. With this, miniaturization, light-weight and high-speed processing of the communication apparatus are achieved.

According to the eighth embodiment, it is possible to provide a technology for reducing time required for calculation of checksums. It is also possible to provide a technology for reducing the scale of hardware required for high-speed checksum calculation.

Given above is an explanation based on the embodiment. The embodiments of the present invention are only illustrative in nature and it will be obvious to those skilled in the art that various variations in combinations of constituting elements and processes are possible within the scope of the present invention.

In this embodiment, a description was given using a telephone apparatus as an example. The technology explained in the embodiments is also applicable to communication equipment in general that transmits and receives stream data, such as a computer and a portable phone.

Although the present invention has been described by way of exemplary embodiments, it should be understood that many changes and substitutions may be made by those skilled in the art without departing from the spirit and the scope of the present invention which is defined only by the appended claims.

What is claimed is:

1. A communication apparatus comprising:
   a receiving section for receiving a packet transmitted via a network;
   a Central Processing Unit ("CPU") for processing a packet by software if the received packet is a packet transmitted using a first communication protocol requiring establishment of connection between apparatuses prior to transmission and reception of data; and
   a dedicated circuit that exists separately from said CPU for exclusively processing the packet transmitted using a second communication protocol not requiring establishment of connection between apparatuses.

2. A communication apparatus comprising:
   a receiving section for receiving a packet transmitted via a network;
   a Central Processing Unit ("CPU") for processing a packet by software if the received packet is a packet transmitted using a first communication protocol requiring acknowledgement of a transmitted packet; and
   a dedicated circuit that exists separately from said CPU for exclusively processing the packet transmitted using a second communication protocol not requiring acknowledgement of a transmitted packet.

3. The communication apparatus according to claim 1, further comprising:
   a transmitting section for transmitting a packet via a network, wherein:
   if a packet for transmission is transmitted using the first communication protocol, the packet is processed by said CPU, and
   if a packet for transmission is transmitted using the second communication protocol, the packet is exclusively processed by said dedicated circuit.

4. The communication apparatus according to claim 1, further comprising a detecting section for identifying a communication protocol used for transmission of the received packet.

5. The communication apparatus according to claim 4, wherein, when said detecting section detects a packet transmitted using the second communication protocol, said detecting section sends the packet to said dedicated circuit bypassing said CPU.

6. The communication apparatus according to claim 1, further comprising a security processing section for encrypting or decrypting data constituting the packet.

7. A communication apparatus comprising:
   a receiving section for receiving a packet transmitted via a network; and
   a first determination section for transferring, when the received packet is a fragmented packet, the received packet to a Central Processing Unit ("CPU") for processing the packet by software, and transferring, when the received packet is a non-fragmented packet, the received packet to a first dedicated circuit that exists separately from said CPU for exclusively processing the packet by a hardware.

8. The communication apparatus according to claim 7, further comprising:
a second determination section for transferring, when the packet processed by said first dedicated circuit is a packet transmitted using a first communication protocol requiring establishment of connection between apparatuses, the packet to said CPU, and transferring, when the packet processed by said first dedicated circuit is a packet transmitted using a second communication protocol not requiring establishment of connection between apparatuses, the packet to a second dedicated circuit that exists separately from said CPU for exclusively processing the packet by a hardware.

9. A telephone apparatus comprising:
an input section for inputting an audio;
a communication section for transmitting the audio inputted by said input section to other apparatus, and receiving an audio from other apparatus; and
an output section for outputting the audio received from other apparatus,
said communication section comprising:
a receiving section for receiving a packet transmitted via a network;
a detecting section for detecting a communication protocol for the received packet;
a Central Processing Unit ("CPU") for processing a packet by software if the communication protocol is a first communication protocol requiring establishment of connection between apparatuses prior to transmission and reception of data; and
a dedicated circuit that exists separately from said CPU for exclusively processing the packet if the communication protocol is a second communication protocol not requiring establishment of connection between apparatuses, wherein
the audio is transmitted and received using the second communication protocol.

10. A video phone apparatus comprising:
an input section for inputting an audio and an image;
a communication section for transmitting the audio and the image inputted by said input section to other apparatus, and receiving an audio and an image from other apparatus; and
an output section for outputting the audio and the image received from other apparatus,
said communication section comprising:
a receiving section for receiving a packet transmitted via a network;
a detecting section for detecting a communication protocol for the received packet;
a Central Processing Unit ("CPU") for processing a packet by software if the communication protocol is a first communication protocol requiring establishment of connection between apparatuses prior to transmission and reception of data; and
a dedicated circuit that exists separately from said CPU for exclusively processing the packet if the communication protocol is a second communication protocol not requiring establishment of connection between apparatuses, wherein
the audio and the image are transmitted and received using the second communication protocol.

11. An image pickup apparatus comprising:
an image pickup section for picking up an image; and
a communication section for transmitting the image picked up by said image pickup section to other apparatus, and receiving an image from other apparatus,
said communication section comprising:
a receiving section for receiving a packet transmitted via a network;
a detecting section for detecting a communication protocol for the received packet;
a Central Processing Unit ("CPU") for processing a packet by software if the communication protocol is a first communication protocol requiring establishment of connection between apparatuses prior to transmission and reception of data; and
a dedicated circuit that exists separately from said CPU for exclusively processing the packet if the communication protocol is a second communication protocol not requiring establishment of connection between apparatuses, wherein
the image is transmitted and received using the second communication protocol.

12. A communication method comprising:
detecting, when a packet is received, a communication protocol for the packet; and
transferring the packet to a circuit for processing the packet in accordance with the communication protocol, wherein
said detecting determines whether the packet is a fragmented or a non-fragmented packet by analyzing a header of the packet, and
said transferring includes transferring the fragmented packet to a Central Processing Unit ("CPU") for processing the packet by software and transferring the non-fragmented packet to a dedicated circuit that exists separately from said CPU for exclusively processing the packet.

13. A communication method comprising:
detecting, when a packet is received, a communication protocol for the packet, and
transferring the packet to a circuit for processing the packet in accordance with the communication protocol, wherein
said detecting determines whether the packet is a packet transmitted using a first communication protocol requiring establishment of connection between apparatuses prior to transmission and reception of data, or a packet transmitted using a second communications protocol not requiring establishment of connection between apparatuses, and
said transferring includes transferring the packet transmitted using the first communication protocol to a Central Processing Unit ("CPU") for processing the packet by software and transferring the packet transmitted using the second communication protocol to a dedicated circuit that exists separately from said CPU for exclusively processing the packet.

14. The communication method according to claim 13, wherein data not requiring real-time processing is transmitted and received using the first communication protocol and stream data requiring real-time processing is transmitted and received using the second communication protocol.

* * * * *